US011770844B2

(12) United States Patent
Zhou et al.

(10) Patent No.: US 11,770,844 B2
(45) Date of Patent: Sep. 26, 2023

(54) METHODS AND APPARATUS FOR SIGNALING OF NETWORK CODING INFORMATION TO FACILITATE FEEDBACK PROCESSING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Sony Akkarakaran, Poway, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/152,764

(22) Filed: Jan. 19, 2021

(65) Prior Publication Data
US 2021/0329644 A1   Oct. 21, 2021

Related U.S. Application Data

(60) Provisional application No. 63/010,582, filed on Apr. 15, 2020.

(51) Int. Cl.
| | |
|---|---|
| *H04L 12/26* | (2006.01) |
| *H04W 72/53* | (2023.01) |
| *H04W 72/044* | (2023.01) |
| *H04W 76/27* | (2018.01) |
| *H04W 28/04* | (2009.01) |
| *H04L 1/1812* | (2023.01) |

(Continued)

(52) U.S. Cl.
CPC ........... *H04W 72/53* (2023.01); *H04L 1/1819* (2013.01); *H04W 28/04* (2013.01); *H04W 72/0466* (2013.01); *H04W 72/21* (2023.01); *H04W 72/23* (2023.01); *H04W 76/27* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2017/0118674 A1* | 4/2017 | Narasimha | ............ H04L 1/0029 |
| 2017/0230144 A1* | 8/2017 | Wu | ............................ H04L 1/08 |

(Continued)

*Primary Examiner* — Sithu Ko
(74) *Attorney, Agent, or Firm* — Procopio, Cory, Hargreaves & Savitch LLP

(57) ABSTRACT

Apparatus, methods, and computer-readable media for facilitating signaling of network coding information to facilitate feedback processing are disclosed herein. An example method for wireless communication at a transmitting device includes encoding data packets based on a first network coding and transmitting encoded data packets to a receiving device. The example method also includes receiving network coding information and determining a second network coding applied by the receiving device based on the network coding information. Additionally, the example method includes receiving feedback from the receiving device and decoding the encoded data packets based on the second network coding applied by the receiving device. Further, the example method includes updating the first network coding applied by the transmitting device based on the feedback and the decoding of the encoded data packets.

11 Claims, 19 Drawing Sheets

(51) Int. Cl.
*H04W 80/02* (2009.01)
*H04W 72/21* (2023.01)
*H04W 72/23* (2023.01)

(56) References Cited

U.S. PATENT DOCUMENTS

| | | | |
|---|---|---|---|
| 2018/0331781 A1* | 11/2018 | Welin | H04L 43/0888 |
| 2019/0068327 A1* | 2/2019 | Ho | H04L 1/0009 |
| 2020/0059821 A1* | 2/2020 | Wirth | H04L 1/1896 |
| 2021/0058989 A1* | 2/2021 | Simsek | H04L 47/283 |
| 2021/0368385 A1* | 11/2021 | Zhu | H04W 28/04 |
| 2021/0385842 A1* | 12/2021 | Zhao | H04L 5/0091 |
| 2022/0264354 A1* | 8/2022 | Kela | H04L 69/28 |

* cited by examiner

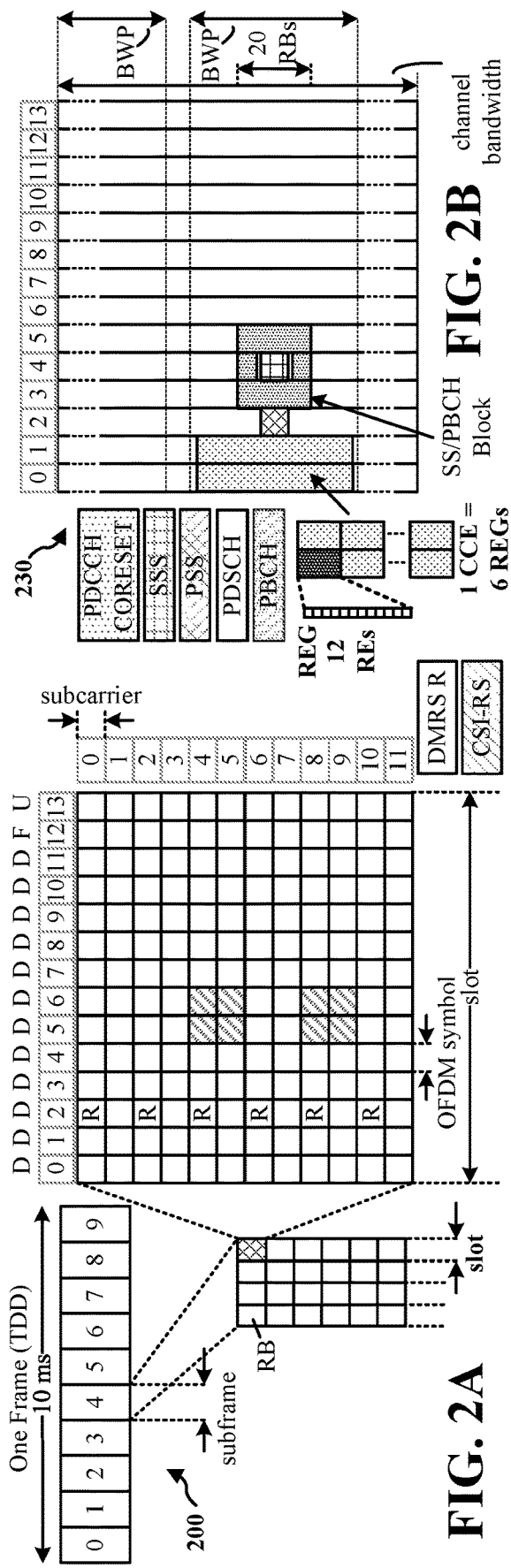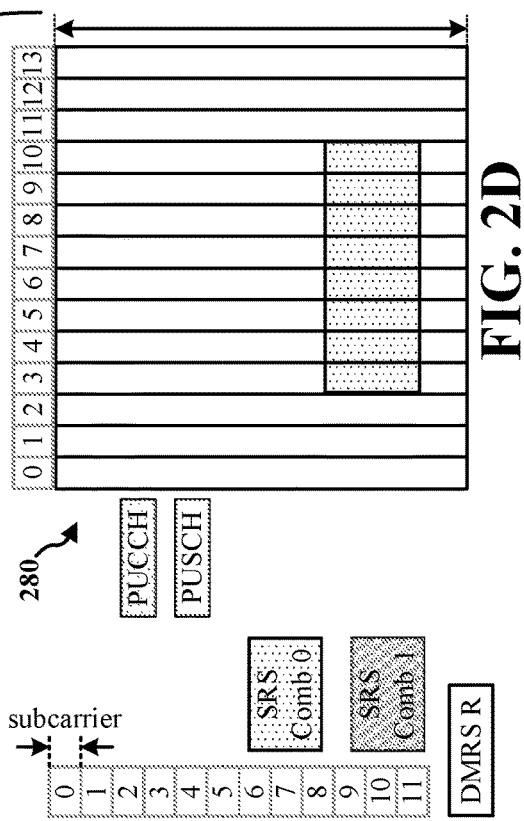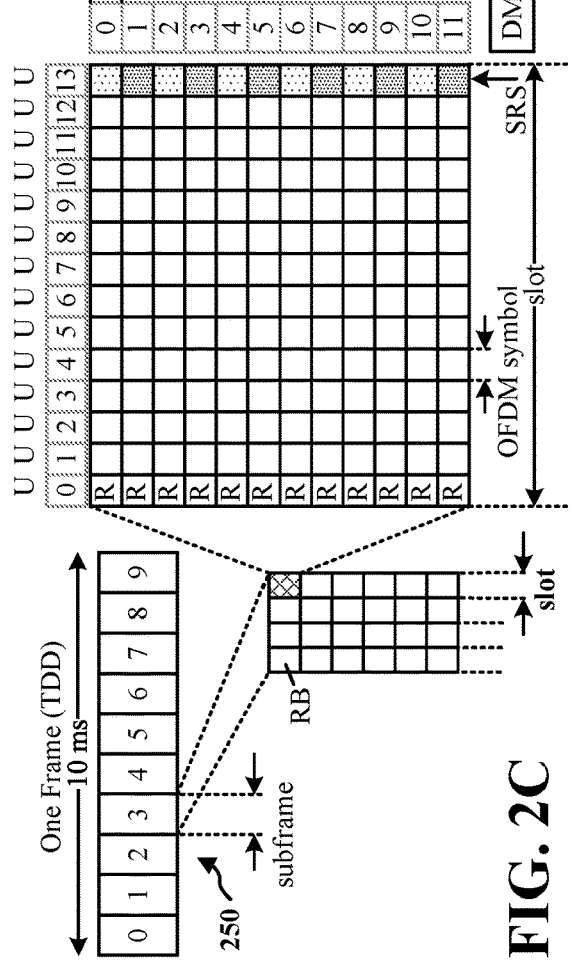
FIG. 2A FIG. 2B FIG. 2C FIG. 2D

METHODS AND APPARATUS FOR SIGNALING OF NETWORK CODING INFORMATION TO FACILITATE FEEDBACK PROCESSING

CROSS REFERENCE TO RELATED APPLICATION(S)

This application claims the benefit of U.S. Provisional Patent Application Ser. No. 63/010,582, entitled "Methods and Apparatus for Signaling of Network Coding Information to Facilitate Feedback Processing" and filed on Apr. 15, 2020, which is expressly incorporated by reference herein in its entirety.

BACKGROUND

Technical Field

The present disclosure relates generally to communication systems, and more particularly, to communication systems utilising network coding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a transmitting device. An example apparatus encodes data packets based on a first network coding and transmits encoded data packets to a receiving device. The example apparatus also receives network coding information and determines a second network coding applied by the receiving device based on the network coding information. Additionally, the example apparatus receives feedback from the receiving device. The example apparatus also decodes the encoded data packets based on the second network coding applied by the receiving device. Further, the example apparatus updates the first network coding applied by the transmitting device based on the feedback and the decoding of the encoded data packets.

In another aspect of the disclosure, a method, a computer-readable medium, and an apparatus are provided for wireless communication of a base station. An example apparatus receives, from a transmitting device or a receiving device, a request to update network coding information for wireless communication. Additionally, the example apparatus transmits updated network coding information to at least one of the transmitting device or the receiving device in response to the request.

In another aspect of the disclosure, a method, a computer-readable medium, and an apparatus are provided for wireless communication of a base station. An example apparatus determines a network coding performance is below a threshold for exchanging encoded packets with a user equipment (UE) based on network coding. The example apparatus also transmits updated network coding information to the UE in response to determining the network coding performance is below the threshold.

In another aspect of the disclosure, a method, a computer-readable medium, and an apparatus are provided for wireless communication of a UE. An example apparatus receives network coding information from a base station. The example apparatus also receives receiving encoded data packets from a transmitting device. Additionally, the example apparatus determines network coding performance below a threshold. Further, the example apparatus transmits a request for a change in network coding parameters to the base station in response to determining the network coding performance is below the threshold. The example apparatus also receives updated network coding information from the base station in response to the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
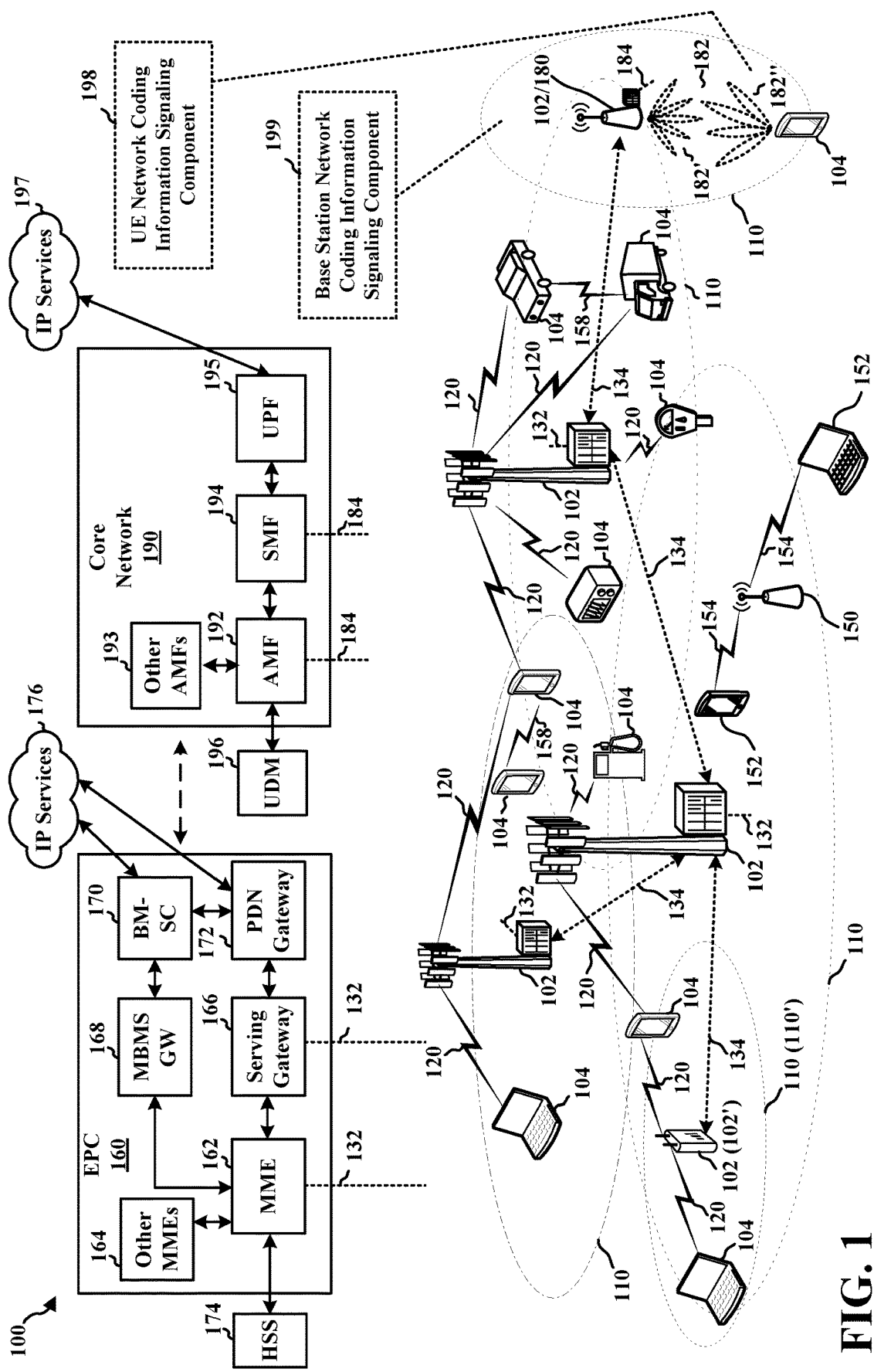
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

FIG. 1 is a diagram illustrating an example of a wireless communications system and an access network 100 that includes UEs 104 in communication with base station 102 or base stations 180. Aspects presented herein may improve reliability of communication between a transmitting device and a receiving device by synchronizing network coding information at the transmitting device and the receiving device. The UE 104 may be configured to manage one or more aspects of wireless communication by detecting occurrences of networking coding information update triggering events and/or network coding parameters update triggering events to facilitate updating networking coding information and/or network coding parameters. As an example, in FIG. 1, the UE 104 may include a UE network coding information signaling component 198. In certain aspects, the UE network coding information signaling component 198 may be configured to encode data packets based on a first network coding and to transmit encoded data packets to a receiving device. The example UE network coding information signaling component 198 may also be configured to receive network coding information and to determine a second network coding applied by the receiving device based on the network coding information. Additionally, the example UE network coding information signaling component 198 may be configured to receive feedback from the receiving device. The example UE network coding information signaling component 198 may also be configured to decode the encoded data packets based on the second network coding applied by the receiving device. Further, the example UE network coding information signaling component 198 may be configured to update the first network coding applied by the transmitting device based on the feedback and the decoding of the encoded data packets.

In another aspect, the example UE network coding information signaling component 198 may be configured to receive network coding information from a base station. The example UE network coding information signaling component 198 may also be configured to receive encoded data packets from a transmitting device. Additionally, the example UE network coding information signaling component 198 may be configured to determine network coding performance below a threshold. Further, the example UE network coding information signaling component 198 may be configured to transmit a request for a change in network coding parameters to the base station in response to determining the network coding performance is below the threshold. The example UE network coding information signaling component 198 may also be configured to receive updated network coding information from the base station in response to the request.

Still referring to FIG. 1, in certain aspects, the base station 180 may be configured to manage one or more aspects of wireless communication by synchronizing network coding information between a transmitting device and a receiving device. As an example, in FIG. 1, the base station 180 may include a base station network coding information signaling component 199. In certain aspects, the base station network coding information signaling component 199 may be configured to receive, from a transmitting device or a receiving device, a request to update network coding information for wireless communication. Additionally, the example base station network coding information signaling component 199 may be configured to transmit updated network coding information to at least one of the transmitting device or the receiving device in response to the request.

In another aspect, the example base station network coding information signaling component 199 may be configured to determine a network coding performance is below a threshold for exchanging encoded packets with a UE based on network coding. The example base station network coding information signaling component 199 may also be configured to transmit updated network coding information to the UE in response to determining the network coding performance is below the threshold.

Although the following description provides examples directed to 5G NR, the concepts described herein may be applicable to other similar areas, such as LTE, LTE-A, CDMA, GSM, and/or other wireless technologies in which signaling of network coding information may be beneficial. It may be appreciated that although the following description provides examples in which a base station is in communication with a transmitting device and/or a receiving device, in some examples, the base station may be a transmitting device and/or a receiving device.

Referring again to FIG. 1, the wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (B SS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^{\mu}*$ 15 kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
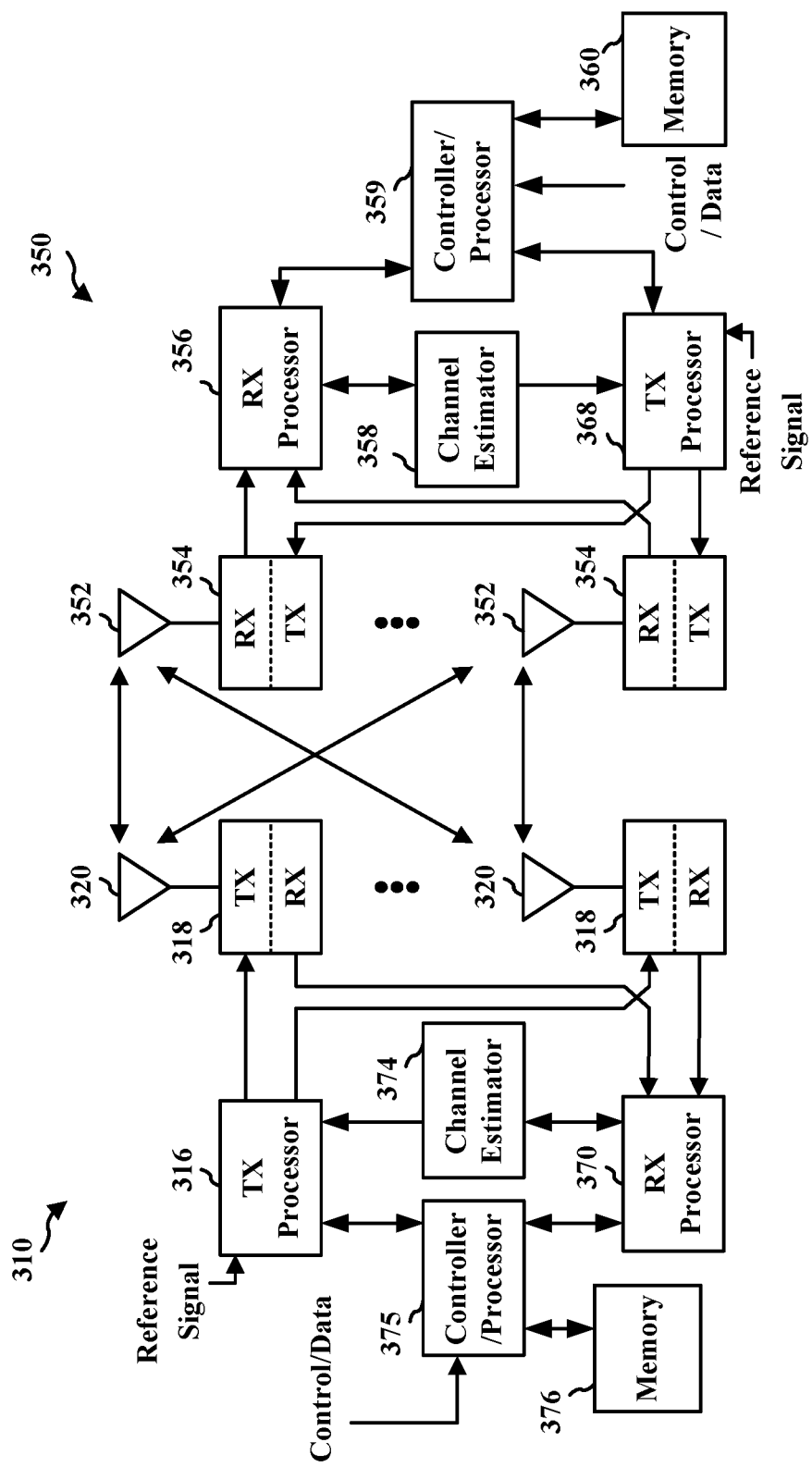
FIG. 3 is a diagram illustrating an example of a base station and a UE, in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE network coding information signaling component 198 of FIG. 1.

At least one of the TX processor 316, the RX processor 370, and the controller/processor 375 may be configured to perform aspects in connection with the base station network coding information signaling component 199 of FIG. 1.

Figure 4:
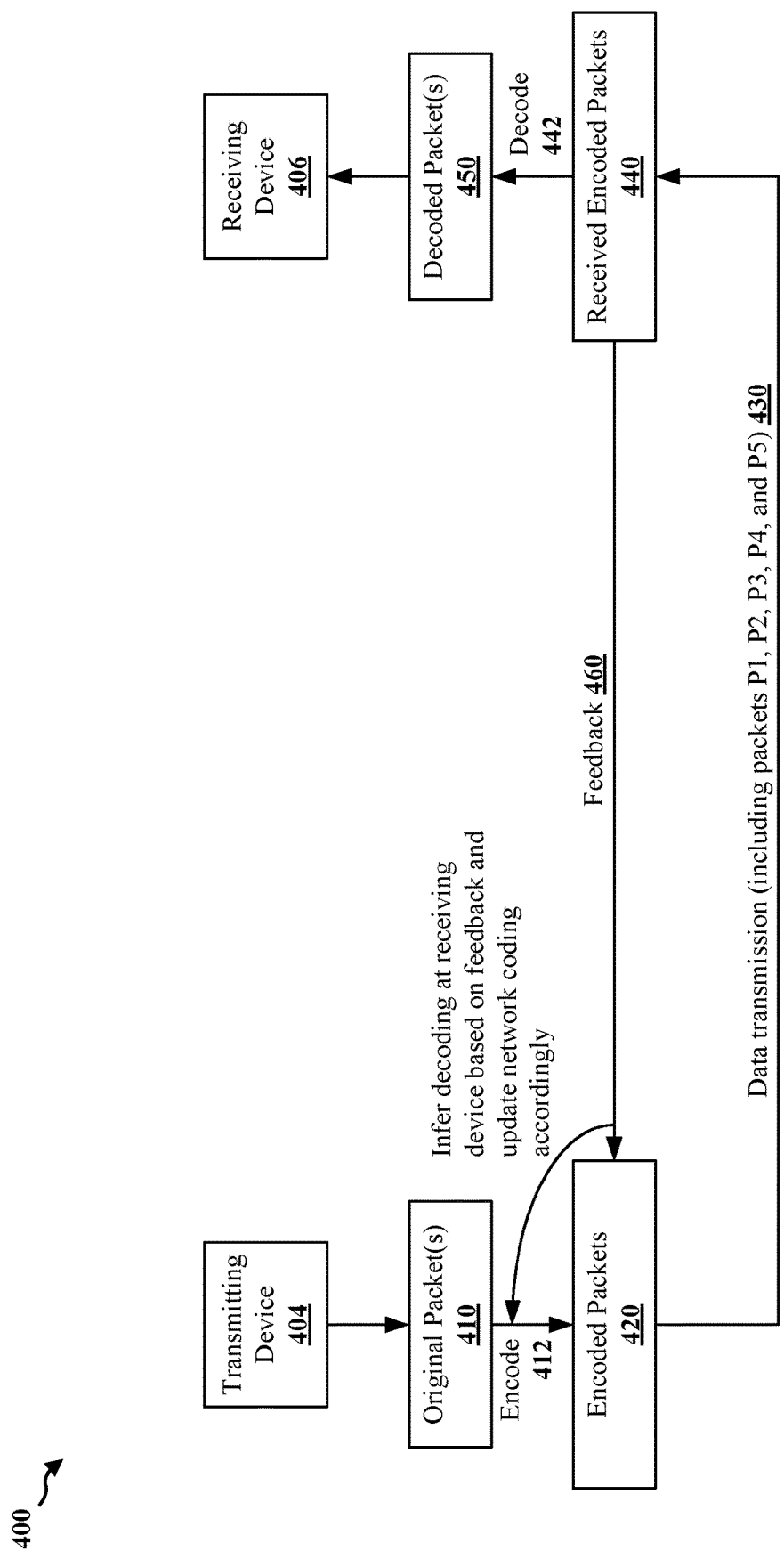
FIG. 4 is an example communication flow between a transmitting device and a receiving device, in accordance with the teachings disclosed herein.

FIG. 4 is an example communication flow 400 between a transmitting device 404 and a receiving device 406, in accordance with one or more techniques disclosed herein. Aspects of the transmitting device 404 may be implemented by the UE 104 and/or the UE 350. Aspects of the receiving device 406 may be implemented by the UE 104 and/or the UE 350. However, in other examples, aspects of the transmitting device 404 and/or aspects of the receiving device 406 may be implemented by a base station (e.g., the base station 102, the base station 180, and/or the base station 310).

In the illustrated example, the transmitting device 404 identifies a packet (e.g., original packet(s) 410) for transmitting to the receiving device 406. The transmitting device 404 applies a network coding algorithm to the original packets 410 to generate encoded packets 420. For example, at 412, the transmitting device 404 may encode the original packets 410 by applying the network coding algorithm to generate the encoded packets 420. In the illustrated example of FIG. 4, the encoded packets 420 include packets P1, P2, P3, P4, and P5. However, in other examples, the encoded packets 420 may include additional or alternative quantities of packets. The transmitting device 404 then transmits the encoded packets 420 to the receiving device 406 via a data transmission 430. In the illustrated example, the data transmission 430 includes the packets P1 to P5.

In the illustrated example, the receiving device 406 receives the data transmission 430 including received encoded packets 440. The received encoded packets 440 may include one or more of the encoded packets 420. The receiving device 406 may then attempt to decode the received encoded packets 440 to reconstruct the original packets at the receiving device. For example, at 442, the receiving device 406 may decode the received encoded packets 440 to generate decoded packet(s) 450. The decoded packets 450 may include one or more of the original packets 410.

In some examples, to improve communication between the transmitting device 404 and the receiving device 406, the receiving device 406 may transmit feedback 460 that is received by the transmitting device 404. The feedback 460 may include, for example, an RLC status report or HARQ feedback. For example, the feedback 460 may indicate, via ACK/NACK feedback, the received encoded packets 440 included in the data transmission 430. In some examples, the transmitting device 404 may use the feedback 460 to process subsequent data transmissions. For example, the transmitting device 404 may use the feedback 460 to determine which packets to re-transmit to the receiving device 406 (e.g., based on the packets that the receiving device 406 did not receive, as indicated by the feedback 460).

In some examples, the transmitting device 404 may infer results of the decoding of the received encoded packets 440 by the receiving device 406 based on the feedback 460. For example, the transmitting device 404 may use the feedback 460 to determine which packets (e.g., which of the packets P1 to P5) the receiving device 406 received. The transmitting device 404 may then apply a decoding procedure to decode the corresponding packets of the encoded packets 420. For example, if the feedback 460 indicates that the receiving device 406 received packets P1, P2, and P5, the transmitting device 404 may apply a decoding procedure to attempt to decode the packets P1, P2, and P5, and infer decoding results at the receiving device 406, accordingly. In some examples, based on the inferred decoding results, the transmitting device 404 may determine to update network coding (e.g., to adjust the encoding of the packet(s) for transmission to the receiving device 406). For example, if the inferred decoding results indicate that the network coding performance between the transmitting device 404 and the receiving device 406 is unsatisfactory (e.g., a quantity of packets being received by the receiving device is less than a threshold quantity of received packets and/or a quantity of packets received by the receiving device 406 that are non-decodable is greater than a threshold quantity of non-decodable packets), the transmitting device 404 may determine that it may be beneficial to update network coding. For example, updating network coding may include applying a different network coding algorithm and/or applying one or more different network coding parameters.

In order to accurately infer the decoding results at the receiving device 406, the transmitting device 404 may apply the same decoding procedure as the receiving device 406. Example techniques disclosed herein employ signaling of network coding information to facilitate feedback processing. For example, the transmitting device 404 may use network coding information received from the network to determine the network coding used by the receiving device 406 and to decode the packets. As another example, when the receiving device 406 or the transmitting device 404 detects network coding performance that is unsatisfactory, the respective device(s) 404, 406 may request that a base station (in communication with the receiving device 406 and the transmitting device 404) provide updated network coding information to the receiving device 406 and the transmitting device 404. For example, the base station may transmit updated network coding information to the respective devices 404, 406 including a different network coding algorithm to apply when transmitting data. Thus, disclosed examples enable the transmitting device and the receiving device to be configured with the same network coding information and, thus, enable the transmitting device to improve the reliability of the inferred decoding results.

Figure 5:
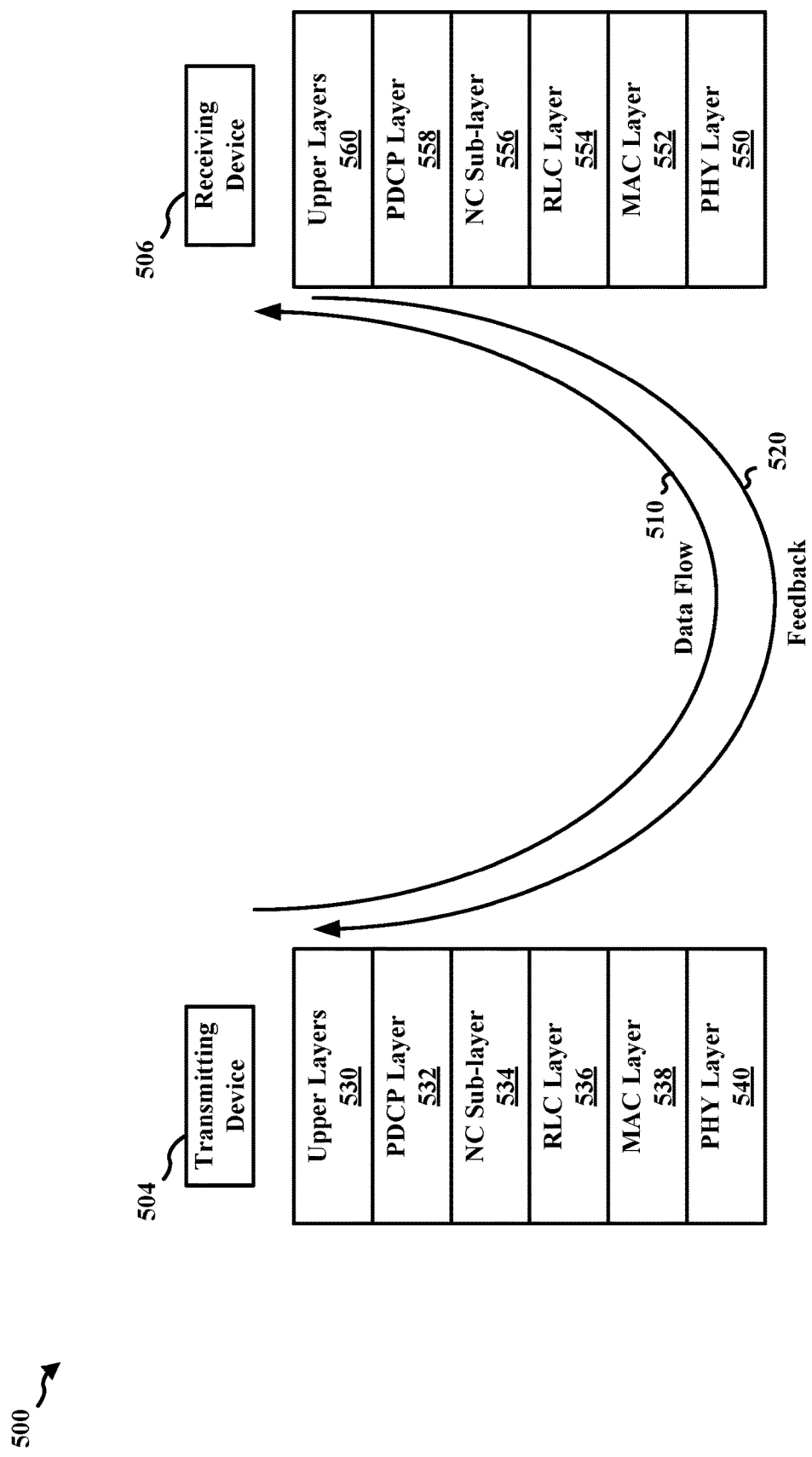
FIG. 5 is a diagram illustrating an example of data flow within a radio protocol architecture of a transmitting device and a receiving device, in accordance with one or more techniques disclosed herein.

FIG. 5 is a diagram 500 illustrating an example of data flow within a radio protocol architecture of a transmitting device 504 and a receiving device 506, in accordance with one or more techniques disclosed herein. Aspects of the transmitting device 504 may be implemented by the UE 104, the UE 350, and/or the transmitting device 404. Aspects of the receiving device 506 may be implemented by the UE 104, the UE 350, and/or the receiving device 406. However, in other examples, aspects of the transmitting device 504 and/or aspects of the receiving device 506 may be implemented by a base station (e.g., the base station 102, the base station 180, and/or the base station 310).

In the illustrated example of FIG. 5, a data flow 510 is transmitted by the transmitting device 504 to the receiving device 506. The data flow 510 is processed starting at upper layers 530 of the transmitting device 504 through to a physical layer 540 of the transmitting device 504 before being transmitted over an air interface to the receiving device 506. For example, the transmitting device 504 may process the data flow 510 at a PDCP layer 532 after the upper layers 530, followed by a network coding (NC) sub-layer 534, an RLC layer 536, and a MAC layer 538 before processing the data flow 510 at the physical layer 540. The receiving device 506 then processes the received data flow 510 starting at a physical layer 550 of the receiving device 506 and up through to upper layers 560 of the receiving device 506. For example, the receiving device 506 may process the received data of the data flow 510 at a MAC layer 552 after the PHY layer 550, followed by an RLC layer 554, a network coding (NC) sub-layer 556, and a PDCP layer 558 before processing the received data at the upper layers 560. Similarly, feedback 520 transmitted by the receiving device 506 is processed from upper layers 560 of the receiving device 506 through to the physical layer 550 of the receiving device 506 before being transmitted over an air interface to the transmitting device 504. The transmitting device 504 then processes the received feedback 520 starting at the physical layer 540 of the transmitting device 504 and up to through to the upper layers 530 of the transmitting device 504.

In the illustrated example of FIG. 5, the radio protocol architecture for the devices 504, 506, implements various processing functions. The physical layer ("PHY") 540, 560 may implement various physical layer signal processing functions. The MAC layer 538, 552, the RLC layer 536, 554, the NC sub-layer 534, 556, and the PDCP layer 532, 558 may be responsible for the link between the devices 504, 506 (and/or a base station) over the physical layer 540, 550.

Although now shown, the devices 504, 506 may have several upper layers above the PDCP layer 532, 558, including a network layer (e.g., an IP layer) that is terminated at the PDN Gateway 172 of FIG. 1 on the network side, and an application layer that is terminated at the other end of the connection.

The PDCP layer 532, 558 provides multiplexing between different radio bearers and logical channels. The PDCP layer 532, 558 may also provide header compression for upper layer data packets to reduce radio transmission overhead, security by ciphering the data packets, and handover support for UEs between base stations. The RLC layer 536, 554 provides a segmentation and reassembly of upper layer data packets, retransmission of lost data packets, and reordering of data packets to compensate for out-of-order reception due to hybrid automatic repeat request (HARQ). The MAC layer 538, 552 provides multiplexing between logical and transport channels. The MAC layer 538, 552 may also be responsible for allocating the various radio resources (e.g., resource blocks) in one cell among the devices 504, 506. The MAC layer 538, 552 may also be responsible for HARQ operations.

In the illustrated example, the radio protocol architecture (sometimes referred to as a "protocol stack") includes the NC sub-layer 534, 556. With respect to the transmitting device 504, the NC sub-layer 534 divides incoming packets (e.g., the original packet(s) 410 of FIG. 4) from the PDCP layer 532 into relatively small and un-encoded packets. The NC sub-layer 534 then encodes the small packets using network coding algorithms, such as LT codes, raptor codes, etc. The NC sub-layer 534 then forwards the encoded packets (e.g., the encoded packets 420 of FIG. 4) to the RLC layer 536 for further processing (e.g., as described above).

With respect to the receiving device 506, the NC sub-layer 556 buffers received encoded packets (e.g., the received encoded packets 440 of FIG. 4) from the RLC layer 554. The NC sub-layer 556 then decodes the buffered packets to recover the original packet(s) (e.g., the decoded packets 450 of FIG. 4). The NC sub-layer 556 then pushes the decoded packets into the PDCP layer 558.

Figure 6:
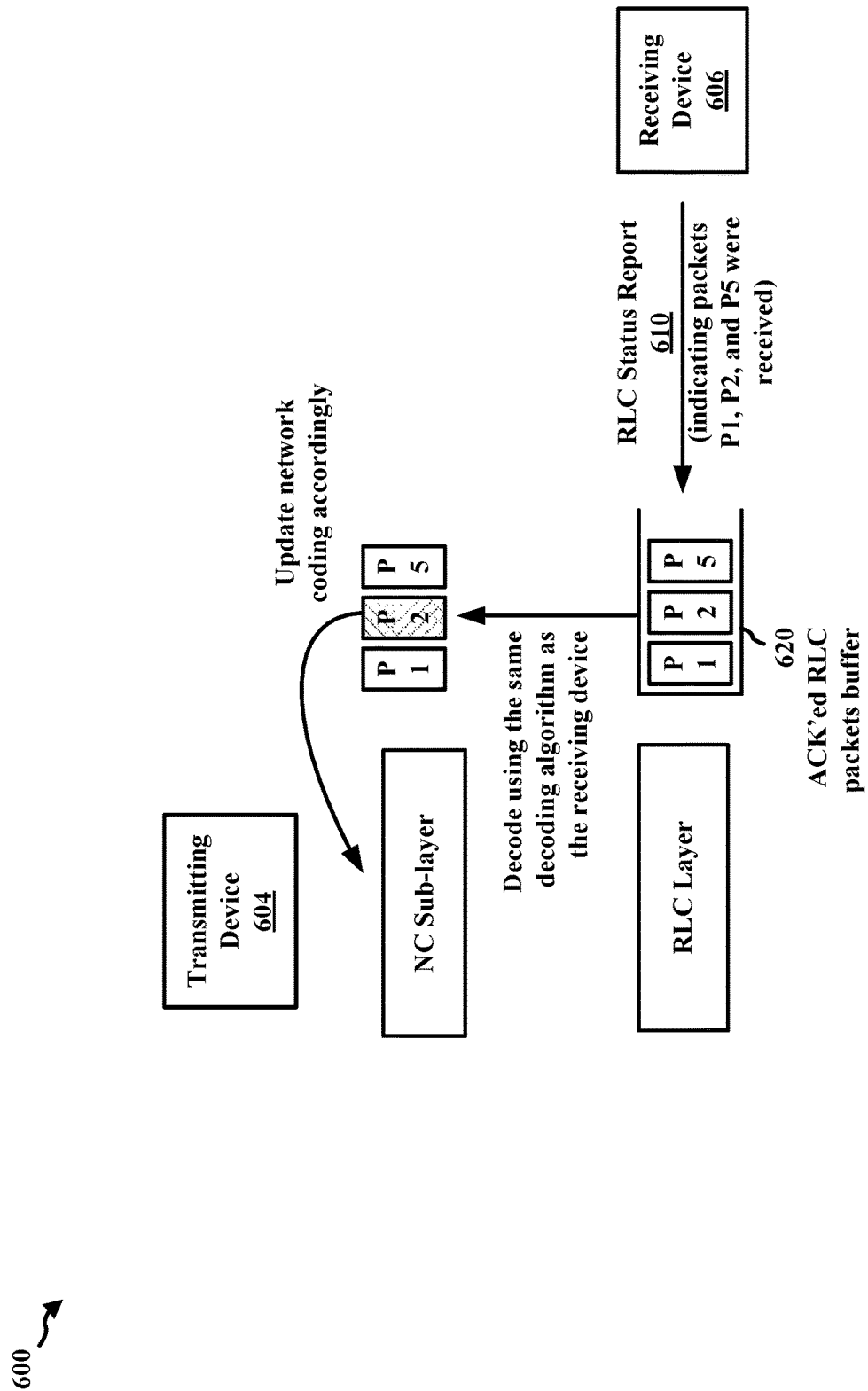
FIG. 6 is a diagram illustrating an example of updating network coding at a transmitting device using feedback received from a receiving device, in accordance with one or more techniques disclosed herein.

FIG. 6 is a diagram 600 illustrating an example of updating network coding at a transmitting device 604 using feedback received from a receiving device 606, in accordance with one or more techniques disclosed herein. Aspects of the transmitting device 604 may be implemented by the UE 104, the UE 350, the transmitting device 404, and/or the transmitting device 504. Aspects of the receiving device 606 may be implemented by the UE 104, the UE 350, the receiving device 406, and/or the receiving device 506. However, in other examples, aspects of the transmitting device 604 and/or aspects of the receiving device 606 may be implemented by a base station (e.g., the base station 102, the base station 180, and/or the base station 310). In the illustrated example, the feedback received by the transmitting device 604 from the receiving device 606 is in response to the transmission of encoded packets (e.g., the data transmission 430 of FIG. 4 including the packets P1 to P5) from the transmitting device 604 to the receiving device 606.

In the illustrated example of FIG. 6, the feedback includes an RLC status report 610 received from an RLC layer of the receiving device 606 (e.g., the example RLC layer 554 of the receiving device 506 of FIG. 5). For example, the RLC status report 610 may include ACK/NACK feedback for different RLC packets. In the illustrated example, the RLC status report 610 indicates that the receiving device 606 received the packets P1, P2, and P5. For example, the RLC status report 610 may include ACKs corresponding to the packets P1, P2, and P5. In some examples, the RLC status report 610 may also (or alternatively) include NACKs corresponding to the missing packets (e.g., the packets P3 and P4).

At an RLC layer of the transmitting device 604 (e.g., the example RLC layer 536 of the transmitting device 504 of FIG. 5), the transmitting device 604 queues the RLC packets corresponding to the ACK'ed RLC packets in an ACK'ed PDU buffer (e.g an example ACK' ed RLC packets buffer 620). For example, the ACK' ed RLC packets buffer 620 may include packets corresponding to the packets P1, P2, and P5. The transmitting device 604 attempts to decode the packets in the ACK'ed RLC packets buffer 620 using a decoding procedure, such as the decoding procedure employed by the receiving device 606 when attempting to decode the received encoded packets (e.g., the received encoded packets 440 of FIG. 4). The transmitting device 604 may attempt to decode the packets in the ACK' ed RLC packets buffer 620 periodically, a-periodically (e.g., as a one-time event), when the ACK'ed RLC packets buffer 620 is full, and/or when a threshold portion of the ACK'ed RCL packets buffer 620 is populated with packets. In the illustrated example, the transmitting device 604 may determine, based on the inferred decoding results, that the receiving device 606 is able to properly decode the packets P1 and P5 and is unable to properly decode the packet P2. The decoding procedure may be applied by an NC sub-layer of the transmitting device 604 (e.g., the example NC sub-layer 534 of the transmitting device 504 of FIG. 5).

In the example, based on the inferred decoding results, the transmitting device 604 may determine to update the network coding applied when transmitting subsequent data to the receiving device 606. For example, if the transmitting device 604 determines that the inferred decoding results indicate network coding performance that is unsatisfactory, the transmitting device 604 may determine that it may be beneficial to apply a different network coding algorithm. As described below in connection with FIG. 8, in some examples, the transmitting device 604 may request that a base station provide updated network coding information including a different network coding algorithm.

Although not shown in FIG. 6, in some examples, the transmitting device 604 may determine that the network coding performance is satisfactory and that communication between the transmitting device 604 and the receiving device 606 may continue using the same network coding algorithm. However, the transmitting device 604 may modify network coding parameters to facilitate the re-transmission of the packets that the receiving device 606 did not receive (e.g., the packets P3 and P4 in the illustrated example) and/or for the packets that the transmitting device 604 infers the receiving device 606 is unable to properly decode (e.g., the packet P2 in the illustrated example). For example, the transmitting device 604 may modify network coding parameters for re-transmitting the missing packets (e.g., the packets P3 and P4) and/or the non-decoded (or non-decodable) packets (e.g., the packet P2) to the receiving device 606 in a subsequent data transmission.

Figure 7:
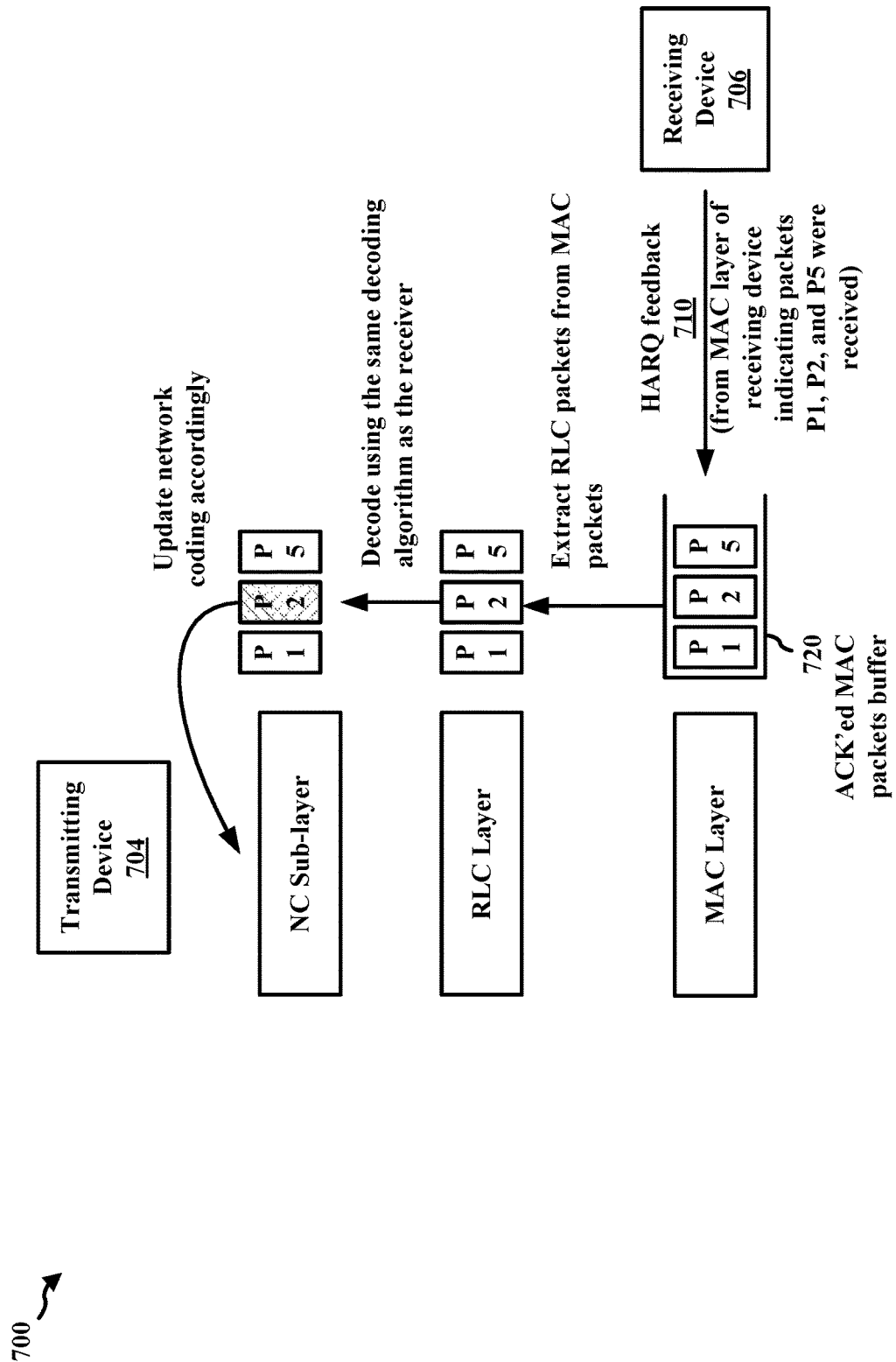
FIG. 7 is another diagram illustrating an example of updating network coding at a transmitting device using feedback received from a receiving device, in accordance with one or more techniques disclosed herein.

FIG. 7 is a diagram 700 illustrating an example of updating network coding at a transmitting device 704 using feedback received from a receiving device 706, in accordance with one or more techniques disclosed herein. Aspects of the transmitting device 704 may be implemented by the UE 104, the UE 350, the transmitting device 404, the transmitting device 504, and/or the transmitting device 604. Aspects of the receiving device 706 may be implemented by the UE 104, the UE 350, the receiving device 406, the receiving device 506, and/or the receiving device 606. However, in other examples, aspects of the transmitting device 704 and/or aspects of the receiving device 706 may be implemented by a base station (e.g., the base station 102, the base station 180, and/or the base station 310). In the illustrated example of FIG. 7, the transmitting device 704 receives the feedback from the receiving device 706 in response to the transmission of encoded packets (e.g., the data transmission 430 of FIG. 4 including the packets P1 to P5).

In the illustrated example of FIG. 7, the feedback includes HARQ feedback 710 received from a MAC layer of the receiving device 706 (e.g., the example MAC layer 552 of the receiving device 506). For example, the HARQ feedback 710 may include ACK/NACK feedback for different MAC layer packets. In the illustrated example, the HARQ feedback 710 indicates that the receiving device 706 received the packets P1, P2, and P5. For example, the HARQ feedback 710 may include ACKs corresponding to the packets P1, P2, and P5. In some examples, the HARQ feedback 710 may also (or alternatively) include NACKs corresponding to the packets that the receiving device 706 did not receive (e.g., the missing packets P3 and P4).

At a MAC layer of the transmitting device 704 (e.g., the example MAC layer 538 of the transmitting device 504 of FIG. 5), the transmitting device 704 queues the MAC packets corresponding to the ACK'ed MAC packets in an ACK'ed PDU buffer (e.g an example ACK'ed MAC packets buffer 720). For example, the ACK'ed MAC packets buffer 720 may include packets corresponding to the packets P1, P2, and P5. An RLC layer of the transmitting device 704 (e.g., the example RLC layer 536 of the transmitting device 504 of FIG. 5) then extracts the RLC packets from the MAC packets included in the ACK' ed MAC packets buffer 720.

The transmitting device 704 attempts to decode the RLC packets extracted from the MAC packets using a decoding procedure, such as the decoding procedure employed by the receiving device 706 when attempting to decode the received encoded packets (e.g., the received encoded packets 440 of FIG. 4). The transmitting device 704 may attempt to decode the packets extracted from the MAC packets periodically and/or a-periodically (e.g., as a one-time event). In some examples, the transmitting device 704 may extract the RLC from the MAC packets when attempting to decode the RLC packets when the ACK'ed MAC packets buffer 720 is full, and/or when a threshold portion of the ACK'ed MAC packets buffer 720 is populated with packets. In the illustrated example, the transmitting device 704 may determine, based on the inferred decoding results, that the receiving device 706 is able to properly decode the packets P1 and P5 and is unable to properly decode the packet P2. The decoding procedure may be applied by a NC sub-layer of the transmitting device 704 (e.g., the example NC sub-layer 534 of the transmitting device 504 of FIG. 5).

In the example, based on the inferred decoding results, the transmitting device 704 may determine to update the network coding applied when transmitting subsequent data to the receiving device 706. For example, if the transmitting device 704 determines that the inferred decoding results indicate network coding performance that is unsatisfactory, the transmitting device 704 may determine that it may be beneficial to apply a different network coding algorithm. As described below in connection with FIG. 8, in some examples, the transmitting device 704 may request that a base station provide updated network coding information including a different network coding algorithm.

Although not shown in FIG. 7, in some examples, the transmitting device 704 may determine that the network coding performance is satisfactory and that communication between the transmitting device 704 and the receiving device 706 may continue using the same network coding algorithm. However, the transmitting device 704 may modify network coding parameters to facilitate the re-transmission of the packets that were not received by the receiving device 706 and/or that the transmitting device 704 infers that the receiving device 706 is unable to properly decode. For example, the transmitting device 704 may modify network coding parameters so that the missing packets (e.g., the packets P3 and P4) and/or the non-decoded (or non-decodable) packets (e.g., the packet P2) may be re-transmitted to the receiving device 706 in a subsequent data transmission.

Figure 8:
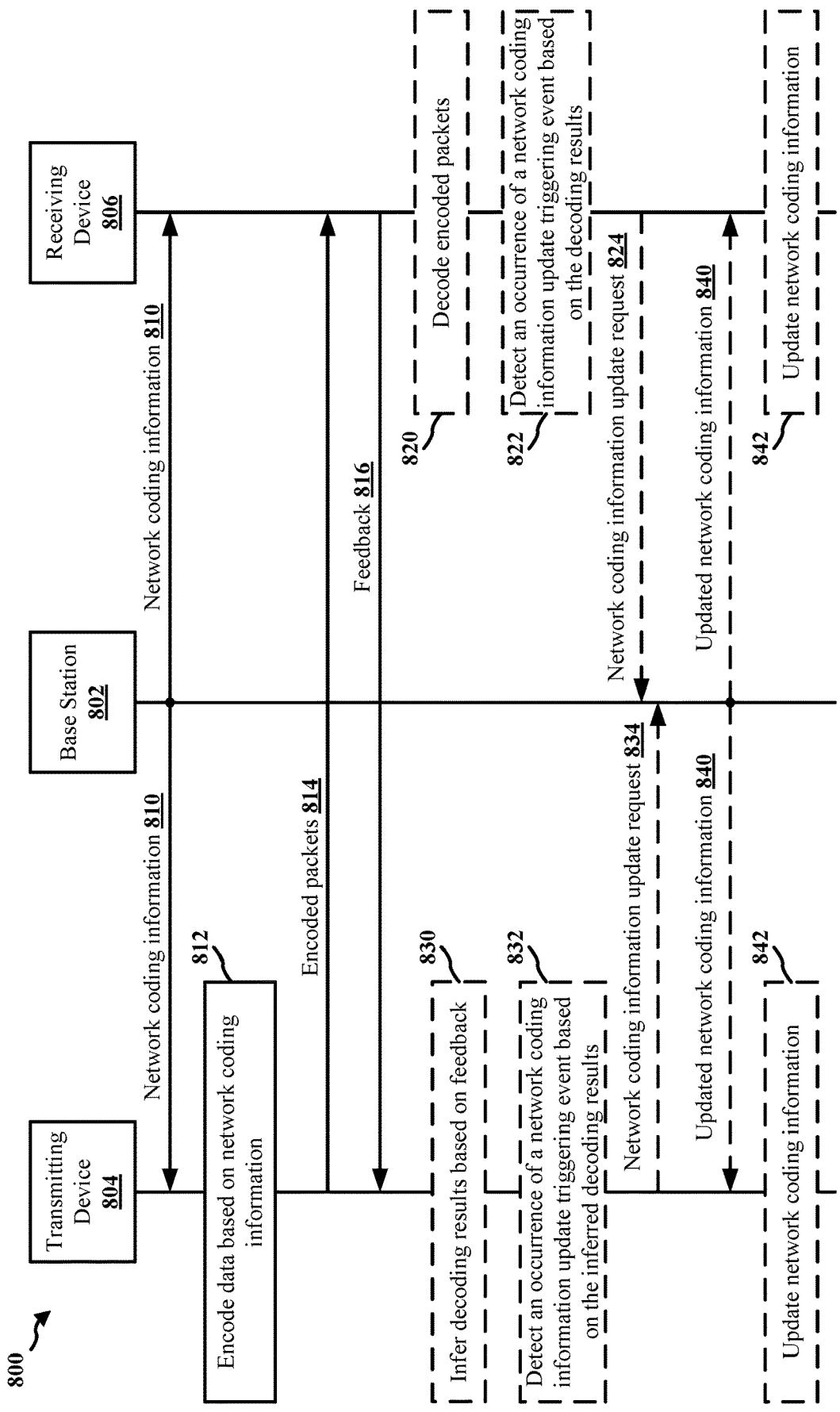
FIG. 8 is an example communication flow between a transmitting device, a base station and a receiving device, in accordance with the teachings disclosed herein.

FIG. 8 illustrates an example communication flow 800 between a base station 802, a transmitting device 804, and a receiving device 806, in accordance with one or more techniques disclosed herein. Aspects of the base station 802 may be implemented by the base station 102, the base station 180, and/or the base station 310. Aspects of the transmitting device 804 may be implemented by the UE 104, the UE 350, the transmitting device 404, the transmitting device 504, the transmitting device 604, and/or the transmitting device 704. Aspects of the receiving device 806 may be implemented by the UE 104, the UE 350, the receiving device 406, the receiving device 506, the receiving device 606, and/or the receiving device 706. In the illustrated example of FIG. 8, the base station 802 is in communication with the transmitting device 804 and the receiving device 806. Additionally, in the illustrated example of FIG. 8, the transmitting device 804 is transmitting data (e.g., the data transmission 430 of FIG. 4 and/or the data flow 510 of FIG. 5) to the receiving device 806. Although not shown in the illustrated example of FIG. 8, in some examples, the transmitting device 804 may transmit data to the receiving device 806 via the base station 802.

In the illustrated example of FIG. 8, the base station 802 transmits network coding information 810 that is received by the transmitting device 804 and by the receiving device 806. The network coding information 810 may include a network coding algorithm (and/or an identifier for a network coding algorithm), one or more network coding parameters, a trigger to cause a device to switch network coding algorithms, and/or a time offset to cause a device to switch network coding algorithms. Example s of network coding algorithms include Luby transform (LT) codes, raptor codes, etc. Examples of network coding parameters include an encoding distribution function, a decoding procedure, a random seed number, a maximum number of interactions, packet identifiers, etc.

In some examples, the base station 802 may transmit the network coding information 810 to the transmitting device 804 and/or the receiving device 806 in a medium access control—control element (MAC-CE) and/or DCI. In some examples, the base station 802 may transmit the network coding information 810 to the devices 804, 806 via RRC connection messages. For example, the base station 802 may transmit the network coding information 810 to the devices 804, 806 during RRC connection establishment (e.g., between the transmitting device 804 and the base station 802 and/or between the receiving device 806 and the base station 802) or during RRC connection modification. Although shown as occurring at relatively the same time in the example of FIG. 8, it may be appreciated that the base station 802 may transmit the network coding information 810 to the devices 804, 806 at different times. For example, the base station 802 may transmit the network coding information 810 to the transmitting device 804 during RRC connection modification at a first time and may transit the network coding information 810 to the receiving device 806 during RRC connection establishment at a second time that occurs after the first time.

At 812, the transmitting device 804 encodes data by applying network coding based on the network coding information 810. For example, the transmitting device 804 may apply a network coding algorithm (e.g., LT codes) and one or more network coding parameters configured via the network coding information 810 to encode data (e.g., the example original packet 410 of FIG. 4). The transmitting device 804 transmits encoded packets 814 that are received by the receiving device 806. For example, the transmitting device 804 may transmit the encoded packets P1 to P5 of FIG. 4.

The receiving device 806 receives one or more of the encoded packets 814 and transmits feedback 816 that is received by the transmitting device 804. Aspects of the feedback 816 may be implemented by the example feedback 460 of FIG. 4 and/or the example feedback 520 of FIG. 5. In some examples, the feedback 816 may include an RLC status report from an RLC layer of the receiving device 806, such as the example RLC status report 610 of FIG. 6. In some examples, the feedback 816 may include HARQ ACK/NACK feedback from the MAC layer of the receiving device 806, such as the example HARQ feedback 710 of FIG. 7.

In the illustrated example of FIG. 8, at least one of the transmitting device 804 and the receiving device 806 detects the occurrence of a network coding information update triggering event based on network coding performance. The network coding performance may be based on results of a decoding procedure performed by the transmitting device 804 or the receiving device 806. The decoding procedure may be indicated by the network coding information 810 provided by the base station 802 and may be used to decode the encoded packets 814. For example, at 820, the receiving device 806 may apply the decoding procedure to decode the one or more received encoded packets 814.

At 822, the receiving device 806 may detect an occurrence of a network coding information update triggering event based on the decoding results. For example, the receiving device 806 may determine the network coding performance is unsatisfactory when the receiving device 806 receives a threshold quantity of non-decodable packets (e.g., the receiving device 806 receives the packets P1, P2, and P5 of FIGS. 4, 5, and/or 6, and is unable to decode a threshold quantity of the received packets P1, P2, and P5) or the receiving device 806 does not receive a threshold quantity of received packets (e.g., the feedback 816 transmitted by the receiving device 806 includes a threshold quantity of NACKs). The threshold quantity of non-decodable packets and/or the threshold quantity of received packets may be indicated by the network coding information 810 and/or may be configured via additional or alternative signaling by the base station 802.

The receiving device 806 may transmit a network coding information update request 824, that is received by the base station 802, in response to detecting the occurrence of the network coding information update triggering event (at 822). The network coding information update request 824 may indicate to the base station 802 that the network coding performance is unsatisfactory (e.g., based on the decoding results at 820). The receiving device 806 may transmit the network coding information update request 824 to the base station 802 in a MAC-CE or via UCI.

In some examples, the decoding procedure may be indicated by the network coding information 810 provided by the base station 802 and may be used by the transmitting device 804 to infer decoding results. For example, at 830, the transmitting device 804 may apply the decoding procedure to decode the one or more encoded packets 814. For example, the transmitting device 804 may infer decoding results based on the feedback 816 received from the receiving device 806. As described above, in some examples, the feedback 816 may include an RLC status report (e.g., the example RLC status report 610 of FIG. 6) or HARQ ACK/NACK feedback (e.g., the example HARQ feedback 710 of FIG. 7). In some such examples, the transmitting device 804 may apply the decoding procedure to the packets included in an ACK'ed PDU buffer (e.g., the example ACK'ed RLC packets buffer 620 of FIG. 6 or the example ACK'ed MAC packets buffer 720 of FIG. 7). The transmitting device 804 may then determine network coding performance based on the inferred decoding results.

At 832, the transmitting device 804 may detect an occurrence of a network coding information update triggering event based on the inferred decoding results. For example, the transmitting device 804 may determine the network coding performance is unsatisfactory when the feedback 816 indicates that the receiving device 806 did not receive a threshold quantity of received packets (e.g., the feedback 816 received from the receiving device 806 includes a threshold quantity of NACKs) or the inferred decoding results (at 830) indicate that the quantity of non-decodable packets at the receiving device 806 is greater than a threshold quantity of non-decodable packets. The threshold quantity of received packets and/or the threshold quantity of non-decodable packets may be indicated by the network coding information 810 and/or may be configured via additional or alternative signaling by the base station 802.

The transmitting device 804 may transmit a network coding information update request 834, that is received by the base station 802, in response to detecting the occurrence of the network coding information update triggering event (at 832). The network coding information update request 834 may indicate to the base station 802 that the network coding performance is unsatisfactory (e.g., based on the inferred decoding results at 830). The transmitting device 804 may transmit the network coding information update request 834 to the base station 802 in a MAC-CE or via UCI.

The base station 802 may transmit updated network coding information 840 that is received by the transmitting device 804 and the receiving device 806. The base station 802 may transmit the updated network coding information 840 in response to receiving the network coding information update request 824 from the receiving device 806 and/or the network coding information update request 834 from the transmitting device 804. The updated network coding information 840 may indicate one or more of an updated network coding algorithm, one or more updated network coding parameters, an updated trigger to switch network coding algorithms, and/or an updated time offset to switch network coding algorithms. For example, the network coding information 810 may configure the transmitting device 804 to apply LT codes as the network coding algorithm and the updated network coding information 840 may configure the transmitting device 804 to apply raptor codes as the network coding algorithm when encoding data. The base station 802 may transmit the updated network coding information 840 to the devices 804, 806 in a MAC-CE or via DCI.

At 842, the transmitting device 804 and the receiving device 806 may update their respective network coding information based on the updated network coding information 840 received from the base station 802.

In some examples, the receiving device 806 may not determine that the network coding performance is unsatisfactory (e.g., the network coding performance is satisfactory). For example, the receiving device 806 may determine, at 822, that the quantity of non-decodable packets at the receiving device 806 is less than the threshold quantity of non-decodable packets or that the quantity of received packets is greater than the threshold quantity of received packets. In some such examples, the receiving device 806 may continue applying the network coding information 810 when decoding subsequently received encoded packets.

Additionally, or alternatively, in some examples, the transmitting device 804 may not determine that the network coding performance is unsatisfactory (e.g., the network coding performance is satisfactory). For example, the transmitting device 804 may determine, at 832, that the inferred quantity of non-decodable packets at the receiving device 806 is less than the threshold quantity of non-decodable packets or that the inferred quantity of received packets is greater than the threshold quantity of received packets. In some such examples, the receiving device 806 may continue applying the network coding information 810 when inferring decoding results for subsequently transmit packets.

In some examples, when the network coding performance is satisfactory, the transmitting device 804 may determine to modify one or more characteristics of the network coding applied when encoding data for a subsequent transmission. For example, the transmitting device 804 may determine to modify one or more network coding parameters based on the feedback 816. In some such examples, the transmitting device 804 may not transmit a request to update the network coding information (e.g., the network coding information update request 834) to the base station 802.

Figure 9:
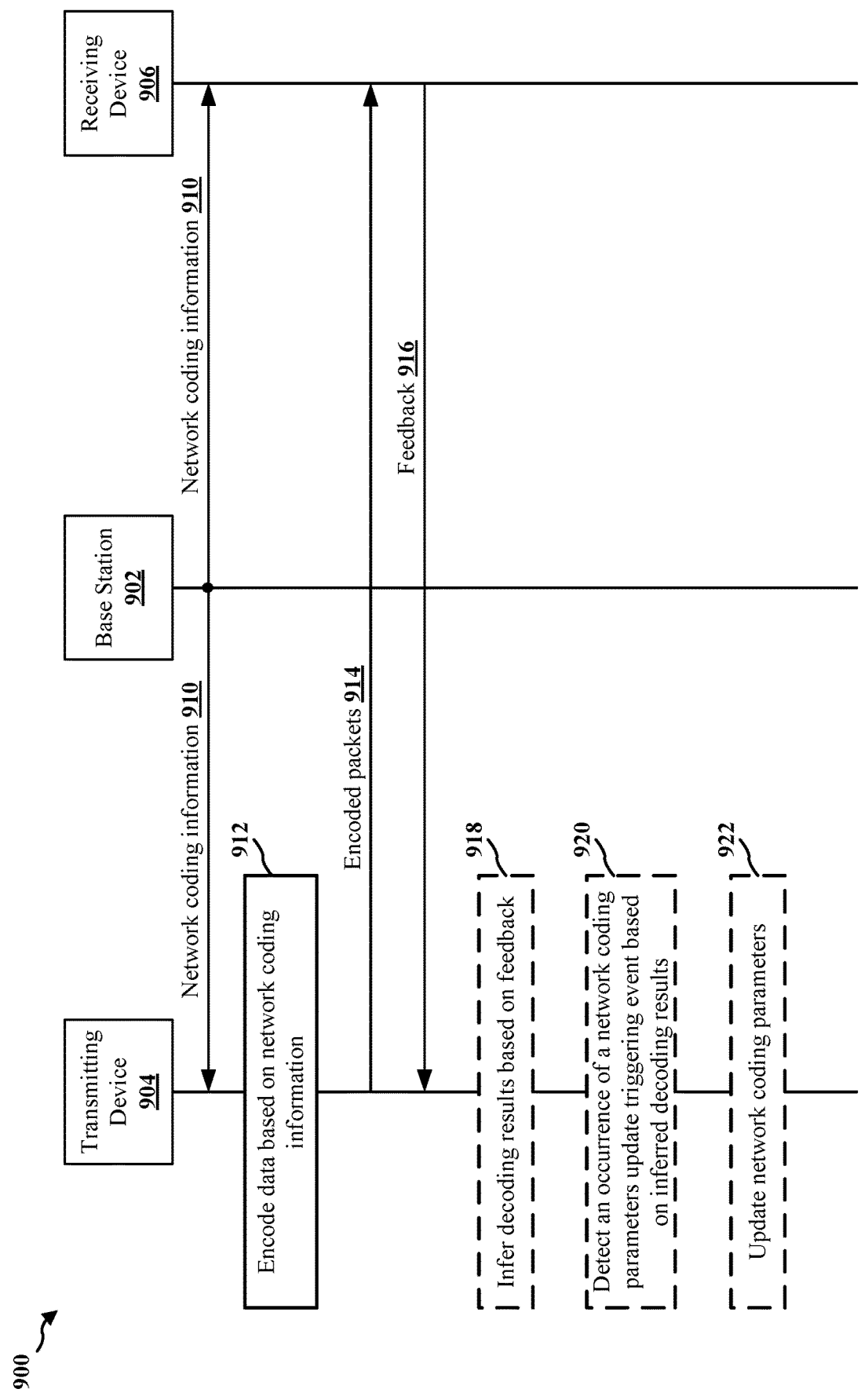
FIG. 9 is another example communication flow between a transmitting device, a base station, and a receiving device, in accordance with the teachings disclosed herein.

FIG. 9 illustrates an example communication flow 900 between a base station 902, a transmitting device 904, and a receiving device 906, in accordance with one or more techniques disclosed herein. Aspects of the base station 902 may be implemented by the base station 102, the base station 180, the base station 310, and/or the base station 802. Aspects of the transmitting device 904 may be implemented by the UE 104, the UE 350, the transmitting device 404, the transmitting device 504, the transmitting device 604, the transmitting device 704, and/or the transmitting device 804. Aspects of the receiving device 906 may be implemented by the UE 104, the UE 350, the receiving device 406, the receiving device 506, the receiving device 606, the receiving device 706, and/or the receiving device 806. In the illustrated example of FIG. 9, the base station 902 is in communication with the transmitting device 904 and the receiving device 906. Additionally, in the illustrated example of FIG. 9, the transmitting device 904 is transmitting data (e.g., the data transmission 430 of FIG. 4 and/or the data flow 510 of FIG. 5) to the receiving device 906. Although not shown in the illustrated example of FIG. 9, in some examples, the transmitting device 904 may transmit data to the receiving device 906 via the base station 902.

In the illustrated example of FIG. 9, the base station 902 transmits network coding information 910 that is received by the transmitting device 904 and by the receiving device 906. Aspects of the network coding information 910 may be similar to the network coding information 810 of FIG. 8.

At 912, the transmitting device 904 encodes data by applying network coding based on the network coding information 910. Aspects of the encoding of the data by applying network coding may be similar to the encoding of the data at 812 of FIG. 8.

As shown in FIG. 9, the transmitting device 904 transmits encoded packets 914 that are received by the receiving device 906. Aspects of the encoded packets 914 may be similar to the encoded packets 814 of FIG. 8.

The receiving device 906 receives one or more of the encoded packets 914 and transmits feedback 916 (e.g., the example feedback 460 of FIG. 4 and/or the example feedback 520 of FIG. 5) that is received by the transmitting device 904. Aspects of the feedback 916 may be similar to the feedback 816 of FIG. 8.

At 918, the transmitting device 904 may infer decoding results based on the feedback 916 received from the receiving device 906. For example, the transmitting device 904 may apply a decoding procedure to decode the one or more encoded packets 914. Aspects of the inferring of the decoding results by the transmitting device 904 may be similar to the inferring of the decoding results at 830 of FIG. 8.

At 920, the transmitting device 904 may detect an occurrence of network coding parameters update triggering event based on the inferred decoding results. For example, the transmitting device 904 may determine that the network coding performance is satisfactory (e.g., as described above in connection with FIG. 8) but that the receiving device 906 did not receive certain ones of the encoded packets 914. For example, based on the feedback 916, the transmitting device 904 may determine that the receiving device 906 did not receive the packets P3 and P4 (e.g., as described above in connection with FIGS. 6 and/or 7). In some such examples, the transmitting device 904 may determine to update one or more network coding parameters to facilitate transmitting the packets not received by the receiving device 906 (e.g., the packets P3 and P4). For example, the network coding parameters may include packet identifiers and the transmitting device 904 may determine to update the network coding parameters to include the packet identifiers associated with the packets not received by the receiving device 906.

At 922, the transmitting device 904 may update the network coding parameters. For example, the transmitting device 904 may update the network coding parameters to include the packet identifiers associated with the packets not received by the receiving device 906 (e.g., packet identifiers associated with the packets P3 and P4).

In some examples, when the transmitting device 904 updates the network coding parameters, the transmitting device 904 may not update additional characteristics of the network coding information 910. For example, the transmitting device 904 may continue to apply the network coding algorithm (e.g., LT codes) indicated by the network coding information 910. In some such examples, the transmitting device 904 may update a portion of the network coding information (e.g., the network coding parameters) without transmitting a request to the base station 902 to update the network coding information (e.g., without transmitting the network coding information update request 834 of FIG. 8).

Although the above description provides separate examples in which the transmitting device may request that the base station provide updated network coding information (e.g., as shown in FIG. 8) or the transmitting device may update network coding parameters without requesting updated network coding information (e.g., as shown in FIG. 9), it may be appreciated that in some examples, the transmitting device may be configured to request that the base station provide updated network coding information and to update network coding parameters without requesting updated network coding information. For example, the transmitting device may transmit the request for updated network coding information when the transmitting device determines that the network coding performance is unsatisfactory. The transmitting device may update network coding parameters without requesting updated network coding information when the transmitting device determines that the network coding performance is satisfactory.

Figure 10:
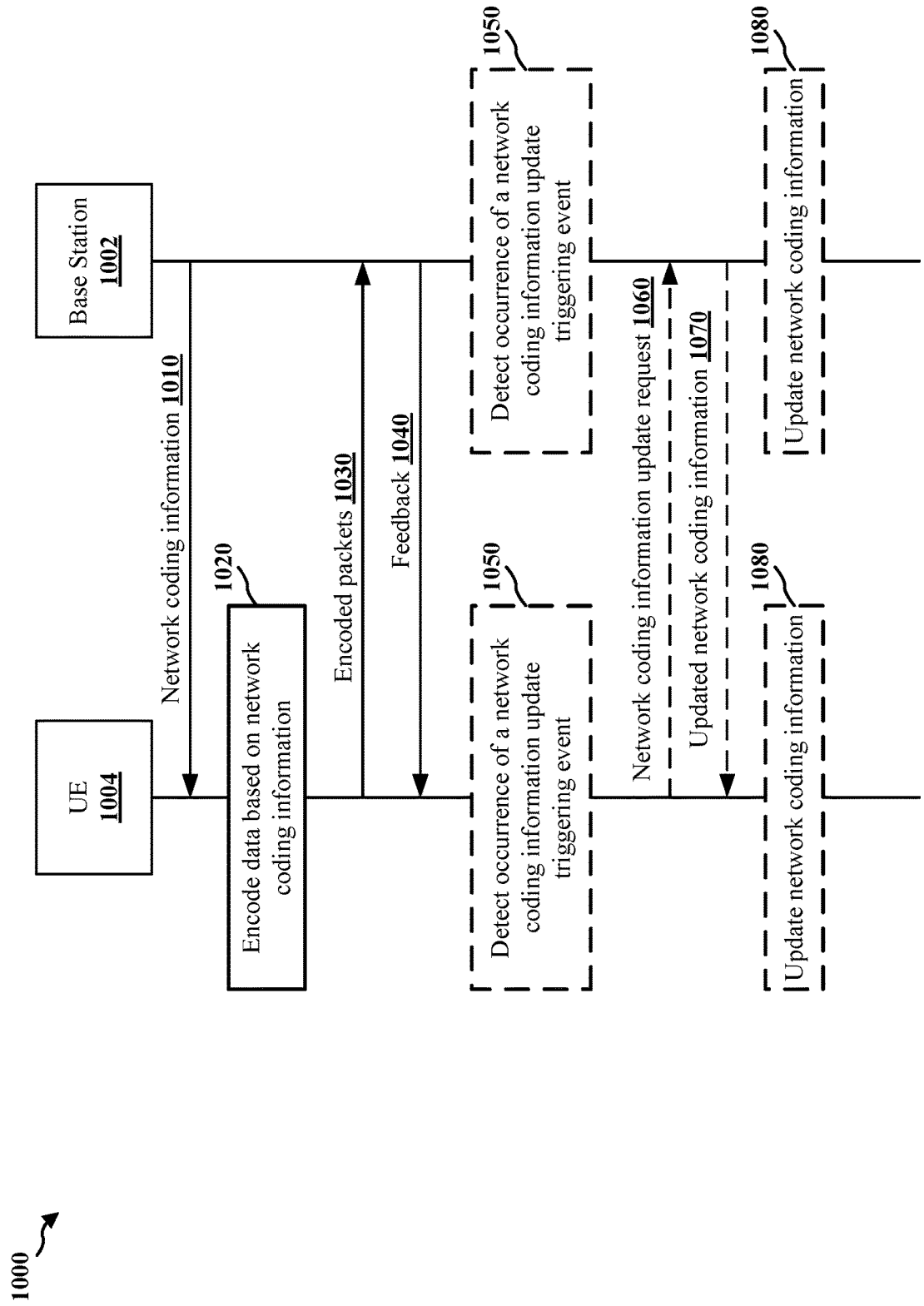
FIG. 10 is an example communication flow between a UE and a base station, in accordance with the teachings disclosed herein.

FIG. 10 illustrates an example communication flow 1000 between a base station 1002 and a UE 1004, in accordance with one or more techniques disclosed herein. Aspects of the base station 1002 may be implemented by the base station 102, the base station 180, the base station 310, the receiving device 406, the receiving device 506, the receiving device 606, the receiving device 706, the base station 802, and/or the base station 902. Aspects of the UE 1004 may be implemented by the UE 104, the UE 350, the transmitting device 404, the transmitting device 504, the transmitting device 604, the transmitting device 704, the transmitting device 804, and/or the transmitting device 904. In the illustrated example of FIG. 10, the base station 1002 is in communication with the UE 1004. Additionally, in the illustrated example of FIG. 10, the UE 1004 is transmitting data (e.g., the data transmission 430 of FIG. 4 and/or the data flow 510 of FIG. 5) that is received by the base station 1002.

In the illustrated example of FIG. 10, the base station 1002 transmits network coding information 1010 that is received by the UE 1004. Aspects of the network coding information 1010 may be similar to the network coding information 810 of FIG. 8 and/or the network coding information 910 of FIG. 9.

At 1020, the UE 1004 encodes data by applying network coding to the data based on the network coding information 1010. Aspects of the encoding of the data by applying network coding at 1020 may be similar to the encoding of the data at 812 of FIG. 8 and/or to the encoding of the data at 912 of FIG. 9.

As shown in FIG. 10, the UE 1004 transmits encoded packets 1030 that are received by the base station 1002. Aspects of the encoded packets 1030 may be similar to the encoded packets 814 of FIG. 8 and/or the encoded packets 914 of FIG. 9.

The base station 1002 receives one or more of the encoded packets 1030 and transmits feedback 1040 (e.g., the example feedback 460 of FIG. 4 and/or the example feedback 520 of FIG. 5) that is received by the UE 1004. Aspects of the feedback 1040 may be similar to the feedback 816 of FIG. 8 and/or the feedback 916 of FIG. 9.

At 1050, at least one of the base station 1002 and the UE 1004 may detect the occurrence of a network coding information update triggering event. In some examples, the UE 1004 may detect the occurrence of the network coding information update triggering event based on the feedback 1040. For example, the UE 1004 may detect the occurrence of the network coding information update triggering event based on inferred decoding results (e.g., as described above in connection with 832 of FIG. 8 and/or in connection with 920 of FIG. 9). For example, the UE 1004 may determine the network coding performance is unsatisfactory when the feedback 1040 indicate s that the base station 1002 did not receive a threshold quantity of received packets (e.g., the feedback 1040 received from the base station 1002 includes a threshold quantity of NACKs) or the inferred decoding results indicate that the quantity of non-decodable packets at the base station 1002 is greater than a threshold quantity of non-decodable packets. The threshold quantity of received packets and/or the threshold quantity of non-decodable packets may be indicated by the network coding information 1010 and/or may be configured via additional or alternative signaling by the base station 1002.

The UE 1004 may transmit a network coding information update request 1060, that is received by the base station 1002, in response to detecting the occurrence of the network coding information update triggering event (e.g., at 1050). The network coding information update request 1060 may indicate to the base station 1002 that the network coding performance is unsatisfactory (e.g., based on the inferred decoding results). The UE 1004 may transmit the network coding information update request 1060 to the base station 1002 in a MAC-CE or via UCI.

As described above, in some examples, the network coding performance may be satisfactory, but the transmitting device (e.g., the UE 1004) may determine that certain packets were not received by the receiving device (e.g., the base station 1002). In some such examples, the UE 1004 may determine to update network coding parameters. In some examples in which the receiving device is a base station, the UE 1004 may transmit the network coding information update request 1060 to request that the base station 1002 provide updated network coding parameters.

As shown in FIG. 10, the base station 1002 may transmit updated network coding information 1070 that is received by the UE 1004. The updated network coding information 1070 may indicate one or more of an updated network coding algorithm, one or more updated network coding parameters, an updated trigger to switch network coding algorithms, and/or an updated time offset to switch network coding algorithms . For example, when the network coding information update request 1060 indicates that the network coding performance is unsatisfactory, the updated network coding information 1070 may configure the UE 1004 to apply a network coding algorithm that is different than the network coding algorithm indicated by the network coding information 1010 (e.g., switch from applying LT codes to raptor codes). In some examples in which the network coding information update request 1060 indicates that the network coding performance is satisfactory, the updated network coding information 1070 may configure the UE 1004 to apply updated network coding parameters that are different than the network coding parameters indicated by the network coding information 1010. The base station 1002 may transmit the updated network coding information 1070 to the UE 1004 in a MAC-CE or via DCI.

At 1080, the base station 1002 and the UE 1004 may update their respective network coding information based on the updated network coding information 1070 received from the base station 1002.

In some examples, the base station 1002 may detect, at 1050, the occurrence of the network coding information update triggering event. Aspects of the detecting of the occurrence of the network coding information update triggering event, at 1050, by the base station 1002 may be similar to the detecting of the occurrence of the network coding information update triggering event at 822 of FIG. 8.

In some examples, when the base station 1002 detects the occurrence of the network coding information update triggering event (e.g., at 1050), the base station 1002 may transmit the updated network coding information 1070 that is received by the UE 1004. In some such examples, the base station 1002 may transmit the updated network coding information 1070 without receiving a request for updated network coding information (e.g., the network coding information update request 1060) from the UE 1004.

Figure 11:
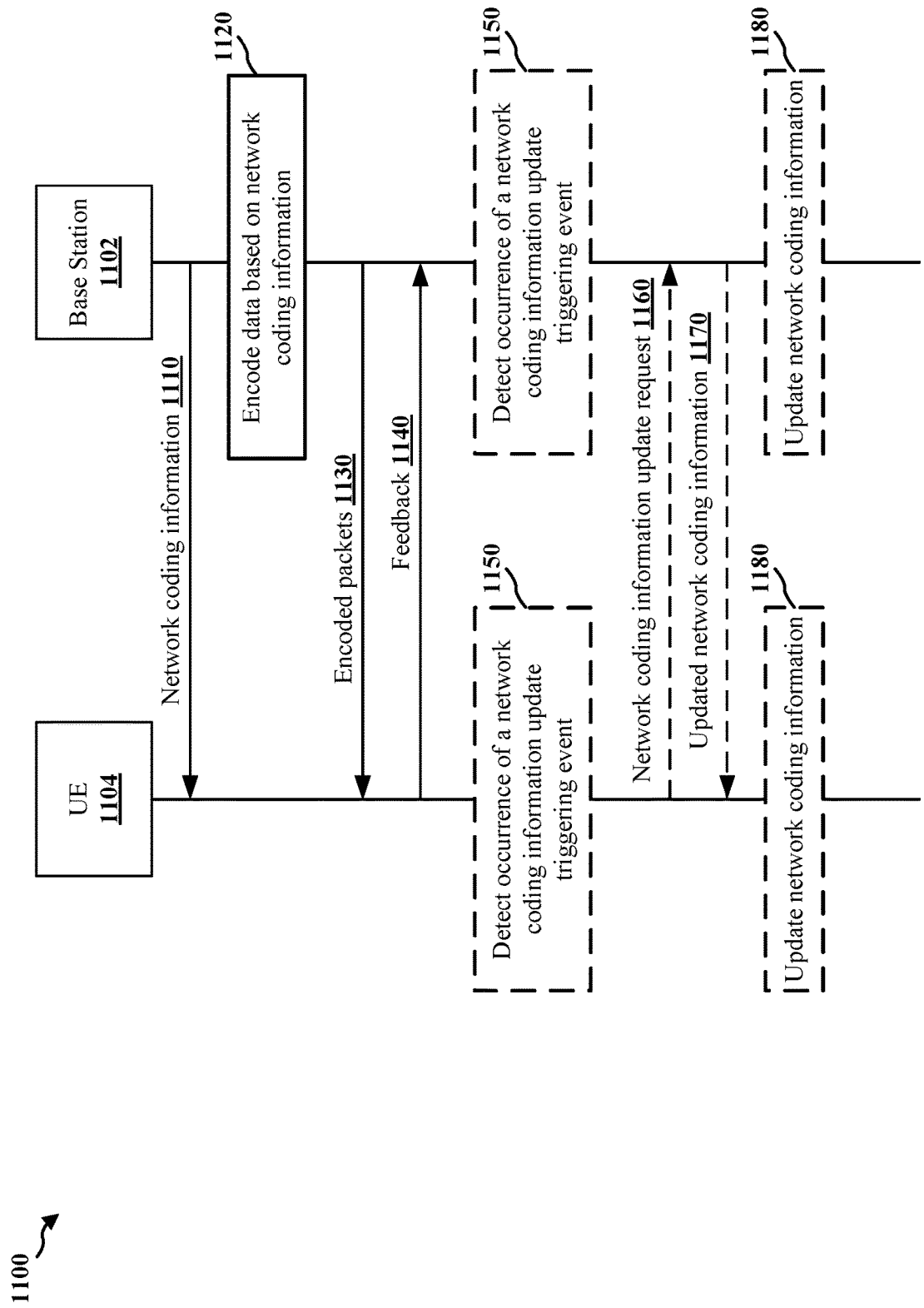
FIG. 11 is another example communication flow between a UE and a base station, in accordance with the teachings disclosed herein.

FIG. 11 illustrates an example communication flow 1100 between a base station 1102 and a UE 1104, in accordance with one or more techniques disclosed herein. Aspects of the base station 1102 may be implemented by the base station 102, the base station 180, the base station 310, the transmitting device 404, the transmitting device 504, the transmitting device 604, the transmitting device 704, the base station 802, the base station 902, and/or the base station 1002. Aspects of the UE 1104 may be implemented by the UE 104, the UE 350, the receiving device 406, the receiving device 506, the receiving device 606, the receiving device 706, the receiving device 806, and/or the receiving device 906. In the illustrated example of FIG. 11, the base station 1102 is in communication with the UE 1104. Additionally, in the illustrated example of FIG. 11, the base station 1102 is transmitting data (e.g., the data transmission 430 of FIG. 4 and/or the data flow 510 of FIG. 5) that is received by the UE 1104.

In the illustrated example of FIG. 11, the base station 1102 transmits network coding information 1110 that is received by the UE 1104. Aspects of the network coding information 1110 may be similar to the network coding information 810 of FIG. 8 and/or the network coding information 910 of FIG. 9.

At 1120, the base station 1102 encodes data by applying network coding to the data based on the network coding information 1110. Aspects of the encoding of the data by applying network coding at 1120 may be similar to the encoding of the data at 812 of FIG. 8 and/or to the encoding of the data at 912 of FIG. 9.

As shown in FIG. 11, the base station 1102 transmits encoded packets 1130 that are received by the UE 1104. Aspects of the encoded packets 1130 may be similar to the encoded packets 814 of FIG. 8 and/or the encoded packets 914 of FIG. 9.

The UE 1104 receives one or more of the encoded packets 1130 and transmits feedback 1140 (e.g., the example feedback 460 of FIG. 4 and/or the example feedback 520 of FIG. 5) that is received by the base station 1102. Aspects of the feedback 1140 may be similar to the feedback 816 of FIG. 8 and/or the feedback 916 of FIG. 9.

At 1150, at least one of the base station 1102 and the UE 1104 may detect the occurrence of a network coding information update triggering event. Aspects of the detecting of the occurrence of the network coding information update triggering event at 1150 by the UE 1104 may be similar to the detecting of the occurrence of the network coding information update triggering event at 822 of FIG. 8.

In some examples, when the UE 1104 detects the occurrence of the network coding information update triggering event (e.g., at 1150), the UE 1104 may transmit a network coding information update request 1160, that is received by the base station 1102, in response to detecting the occurrence of the network coding information update triggering event (e.g., at 1150). The network coding information update request 1160 may indicate to the base station 1102 that the network coding performance is unsatisfactory (e.g., based on the decoding results). The UE 1104 may transmit the network coding information update request 1160 to the base station 1102 in a MAC-CE or via UCI.

As shown in FIG. 11, the base station 1102 may transmit updated network coding information 1170 that is received by the UE 1104. The updated network coding information 1170 may indicate one or more of an updated network coding algorithm, one or more updated network coding parameters, an updated trigger to switch network coding algorithms, and/or an updated time offset to switch network coding algorithms. For example, when the network coding information update request 1160 indicates that the network coding performance is unsatisfactory, the updated network coding information 1170 may configure the UE 1104 to apply a network coding algorithm that is different than the network coding algorithm indicated by the network coding information 1110 (e.g., switch from applying LT codes to raptor codes). In some examples in which the network coding information update request 1160 indicates that the network coding performance is satisfactory, the updated network coding information 1170 may configure the UE 1104 to apply updated network coding parameters that are different than the network coding parameters indicated by the network coding information 1110. The base station 1102 may transmit the updated network coding information 1170 to the UE 1104 in a MAC-CE or via DCI.

At 1180, the base station 1102 and the UE 1104 may update their respective network coding information based on the updated network coding information 1170 received from the base station 1102.

In some examples, the base station 1102 may detect, at 1150, the occurrence of the network coding information update triggering event. Aspects of the detecting of the occurrence of the network coding information update triggering event, at 1150, by the base station 1102 may be similar to the detecting of the occurrence of the network coding information update triggering event at 832 of FIG. 8 and/or the detecting of the network coding information update triggering event 1050 by the UE 1004 of FIG. 10.

As described above, in some examples, the network coding performance may be satisfactory, but the transmitting device (e.g., the base station 1102) may determine that certain packets of the encoded packets 1130 were not received by the receiving device (e.g., the UE 1104). In some such examples, the base station 1102 may determine to update network coding parameters. In some examples, when the base station 1102 detects the occurrence of the network coding information update triggering event (e.g., at 1150), the base station 1102 may transmit the updated network coding information 1170 that is received by the UE 1104. In some such examples, the base station 1102 may transmit the updated network coding information 1170 without receiving a request for updated network coding information (e.g., the network coding information update request 1160) from the UE 1104.

Figure 12:
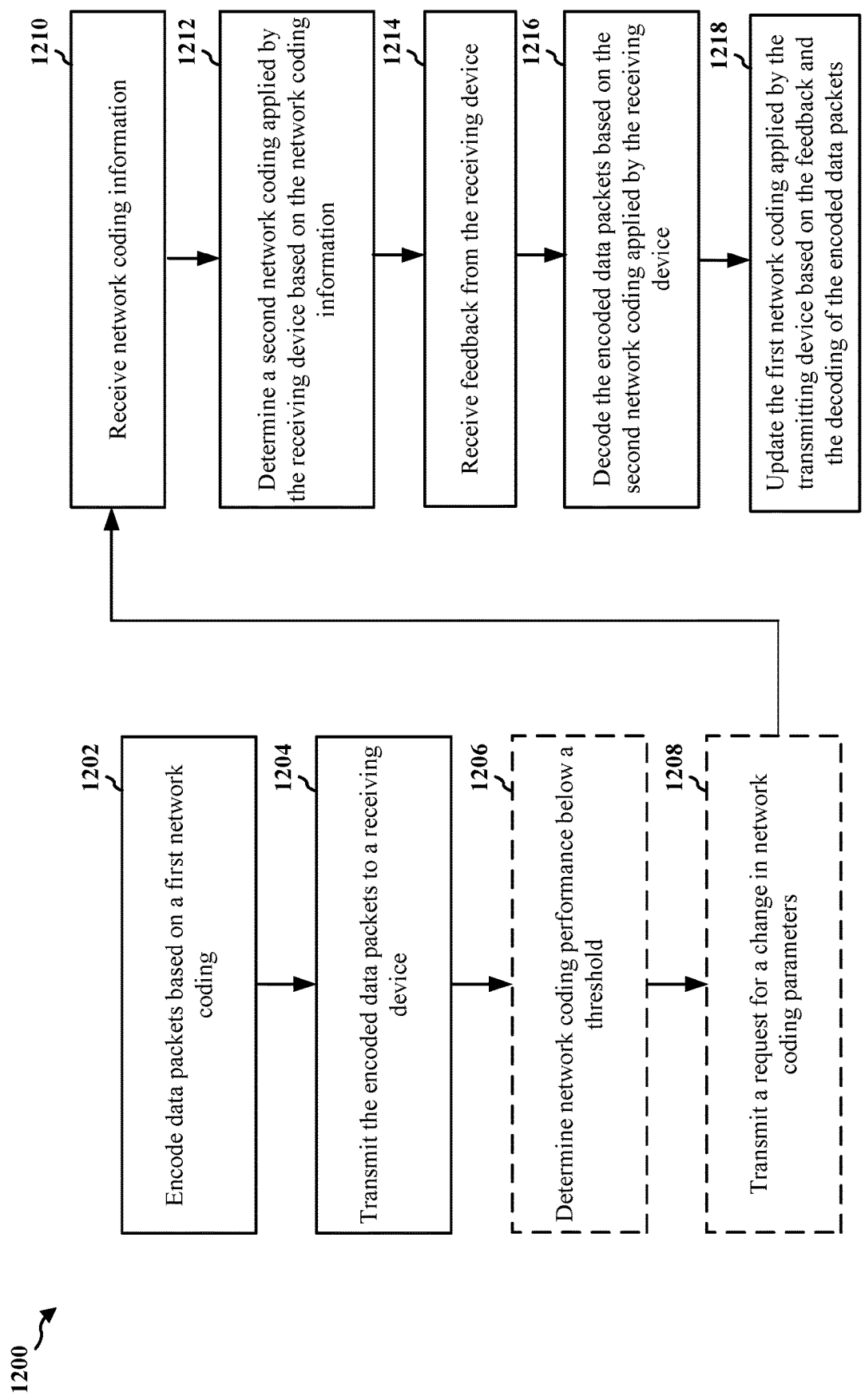
FIG. 12 is a flowchart of a method of wireless communication at a transmitting device, in accordance with the teachings disclosed herein.

FIG. 12 is a flowchart 1200 of a method of wireless communication at a transmitting device. In some examples, the transmitting device may be a UE (e.g., the UE 104, the UE 350, and/or an apparatus 1302 of FIG. 13). In other examples, the transmitting device may be a base station or a component of a base station (e.g., the base station 102, the base station 180, and/or the base station 310). Optional aspects are illustrated with a dashed line. The method may improve encoding of packets at a transmitting device.

At 1202, the transmitting device encodes data packets based on a first network coding, as described in connection with 812 of FIG. 8. For example, 1202 may be performed by an encoding component 1340 of the apparatus 1302 of FIG. 13. The first network coding may include one or more network coding algorithm (e.g., may indicate LT codes, raptor codes, etc.). The first network coding may include at least one network coding parameter (e.g., an encoding distribution function, a decoding procedure, a random seed number, a maximum number of interactions, etc.). In some examples, the first network coding may be based on network coding information received by the transmitting device.

At 1204, the transmitting device transmits encoded data packets to a receiving device, as described in connection with transmission of the encoded packets 814 of FIG. 8. For example, 1204 may be performed by a data transmission component 1342 of the apparatus 1302 of FIG. 13. In some examples, the transmitting device may be a first UE and the receiving device may be a second UE.

At 1206, the transmitting device may determine network coding performance below a threshold, as described in connection with 832 of FIG. 8 and/or 920 of FIG. 9. For example, 1206 may be performed by a network coding performance component 1344 of the apparatus 1302 of FIG. 13. The network coding performance may be based on network decoding results of the receiving device. In some examples, the transmitting device may be a UE and the receiving device may be a base station. In other examples, the transmitting device may be a base station transmitting to a UE.

At 1208, the transmitting device may transmit a request for a change in network coding parameters, as described in connection with the network coding information update request 834 of FIG. 8. For example, 1208 may be performed by a request transmission component 1346 of the apparatus 1302 of FIG. 13. The transmitting device may transmit the request for the change in UCI or a MAC-CE.

At 1210, the transmitting device receives network coding information, as described in connection with the updated network coding information 840 of FIG. 8. For example, 1210 may be performed by a network coding information component 1348 of the apparatus 1302 of FIG. 13. The network coding information may indicate one or more network coding algorithms (e.g., may indicate LT codes, raptor codes, etc.). The network coding information may indicate at least one network coding parameter (e.g., an encoding distribution function, a decoding procedure, a random seed number, a maximum number of interactions, etc.). The network coding information may indicate one or more triggers to cause a device to switch network coding algorithms and/or a time offset to cause a device to switch to the network coding algorithms. The network coding information may indicate a combination of one or more of a network coding algorithm, at least one network coding parameter, a trigger to cause a device to switch network coding algorithms, or a time offset to cause a device to switch the network coding algorithms. The network coding information may be received from a base station. For example, the network coding information may be received from the base station in at least one of an RRC configuration, an MAC-CE, or DCI.

At 1212, the transmitting device determines a second network coding applied by the receiving device based on the network coding information, as described in connection with 842 of FIG. 8. For example, 1212 may be performed by the network coding information component 1348 of the apparatus 1302 of FIG. 13. The network coding information may indicate a network coding that is applied by the receiving device (e.g., a network coding algorithm, network coding parameters, switch triggers, time offset, etc.).

At 1214, the transmitting device receives feedback from the receiving device, as described in connection with the feedback 816 of FIG. 8. For example, 1214 may be performed by a feedback component 1350 of the apparatus 1302 of FIG. 13. The feedback may include an RLC status report from an RLC layer of the receiving device and/or HARQ feedback from the receiving device.

At 1216, the transmitting device decodes the encoded data packets based on the second network coding applied by the receiving device, as described in connection with 830 of FIG. 8. For example, 1216 may be performed by a decoding component 1352 of the apparatus 1302 of FIG. 13. By decoding the encoded packets using the network coding that is applied by the receiving device, the transmitting device may infer a packet decoding result at the receiving device, which may enable the transmitting device to update network coding mechanisms to improve data transmission for the receiving device.

At 1218, the transmitting device updates the first network coding applied by the transmitting device based on the feedback and the decoding of the encoded data packets, as described in connection with 842 of FIG. 8. For example, 1218 may be performed by the network coding information component 1348 of the apparatus 1302 of FIG. 13. Although not illustrated, the transmitting device may encode packets and transmit packets to the receiving device based on the updated first network coding.

In some examples, the transmitting device may receive, at 1210, the network coding information in response to the request transmitted at 1208. In some examples, the first network coding applied by the transmitting device may be updated in response to the feedback from the receiving device. For example, the transmitting device can also update its encoding function (e.g., encoding parameters) autonomously using the feedback information from the receiving device that is received at 1214. For example, the transmitting device may intend to send packets P1, P2, and P3. The transmitting device may encode them into encoded packets as P1+P2, P1+P3, P3 (e.g., at 1202). The receiving device may decode the packets P1 and P3 and send feedback to the decoding device notifying the successful reception of the packets P1 and P3 (e.g., that is received at 1214). Then, the transmitting device can update its encoding function (e.g., at 1218) to only generate the packet P2 as the next encoded packet. In this example, the transmitting device does not request a change in network coding parameters from the base station. Instead, the transmitting device autonomously updates the coding parameters. The updating of the coding parameters may be performed, for example, at the NC sub-layer of the transmitting device (e.g., the NC sub-layer 534 of the transmitting device 504 of FIG. 5).

Figure 13:
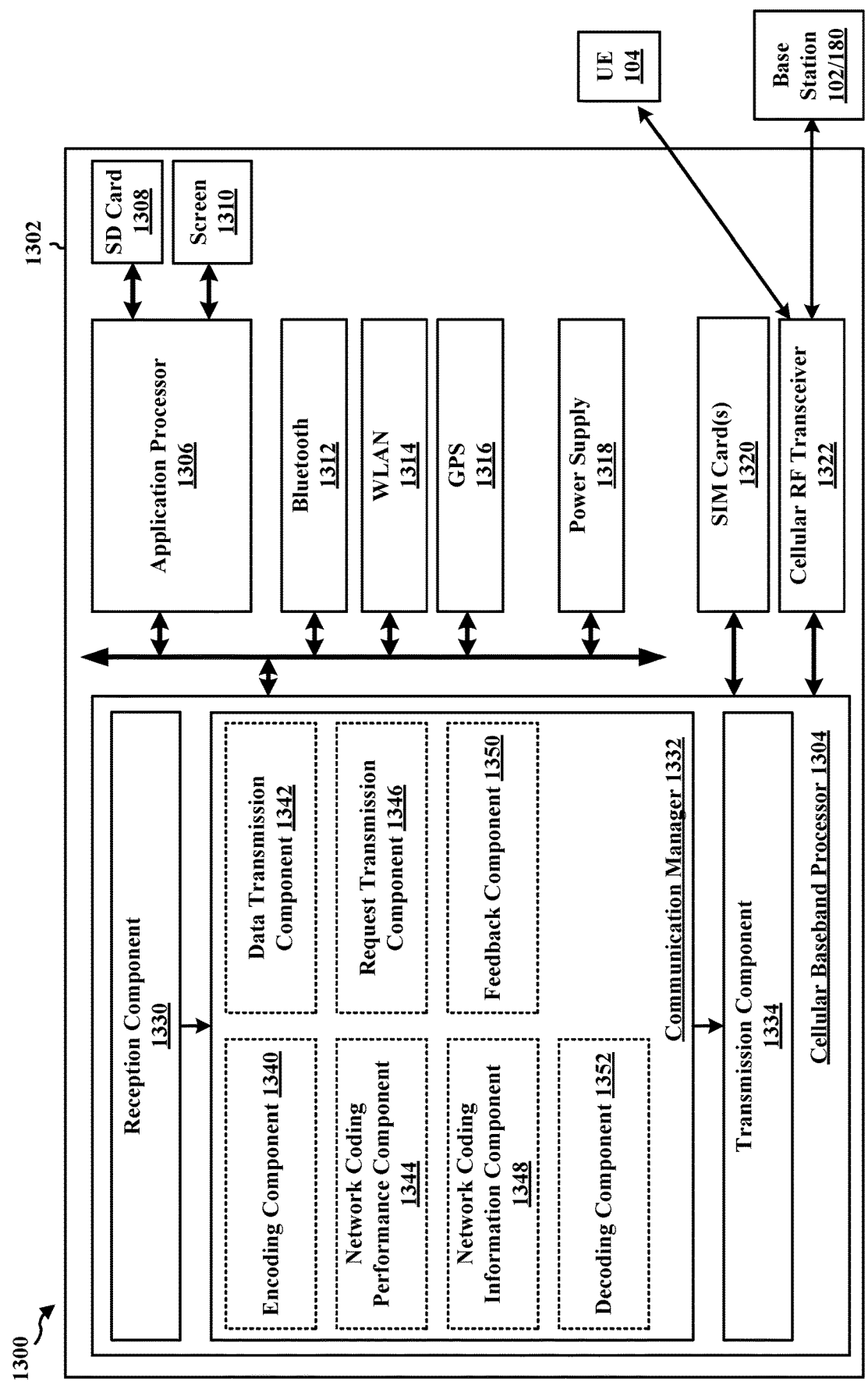
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may comprise a transmitting device, such as a UE, and includes a cellular baseband processor 1304 (also referred to as a modem) coupled to a cellular RF transceiver 1322 and one or more subscriber identity module s (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the UE 350 of FIG. 3) and include the additional modules of the apparatus 1302.

The communication manager 1332 includes an encoding component 1340 that is configured to encode data packets based on a first network coding, for example, as described in connection with 1202 of FIG. 12. The communication manager 1332 also includes a data transmission component 1342 that is configured to transmit encoded data packets to a receiving device, for example, as described in connection with 1204 of FIG. 12. The communication manager 1332 also includes a network coding performance component 1344 that is configured to determine network coding performance below a threshold, for example, as described in connection with 1206 of FIG. 12. The communication manager 1332 also includes a request transmission component 1346 that is configured to transmit a request for a change in network coding parameters, for example, as described in connection with 1208 of FIG. 12. The communication manager 1332 also includes a network coding information component 1348 that is configured to receive network coding information, for example, as described in connection with 1210 of FIG. 12, that is configured to determine a second network coding applied by the receiving device based on the network coding information, for example, as described in connection with 1212 of FIG. 12, and/or that is configured to update the first network coding applied by the transmitting device based on the feedback and the decoding of the encoded data packets, for example, as described in connection with 1218 of FIG. 12. The communication manager 1332 also includes a feedback component 1350 that is configured to receive feedback from the receiving device, for example, as described in connection with 1214 of FIG. 12. The communication manager 1332 also includes a decoding component 1352 that is configured to decode the encoded data packets based on the second network coding applied by the receiving device, for example, as described in connection with 1216 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for encoding data packets based on a first network coding. The example apparatus 1302 also includes means for transmitting encoded data packets to a receiving device. The example apparatus 1302 also includes means for receiving network coding information. The example apparatus 1302 also includes means for determining a second network coding applied by the receiving device based on the network coding information. The example apparatus 1302 also includes means for receiving feedback from the receiving device. The example apparatus 1302 also includes means for decoding the encoded data packets based on the second network coding applied by the receiving device. The example apparatus 1302 also includes means for updating the first network coding applied by the transmitting device based on the feedback and the decoding of the encoded data packets.

The aforementioned means may be one or more of the aforementioned components of the apparatus 1302 configured to perform the functions recited by the aforementioned means. As described supra, the apparatus 1302 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 14:
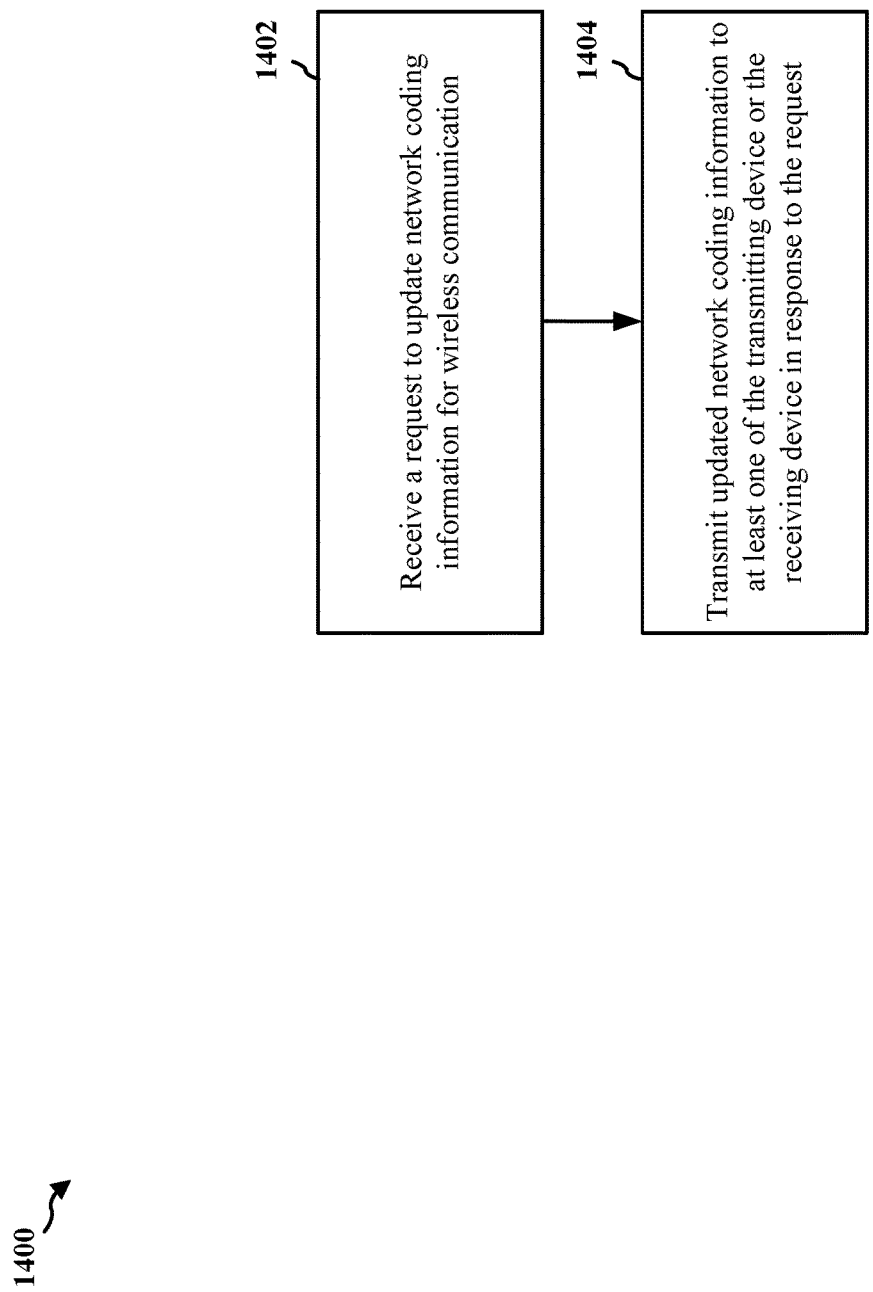
FIG. 14 is a flowchart of a method of wireless communication at a base station, in accordance with the teachings disclosed herein.

FIG. 14 is a flowchart 1400 of a method of wireless communication. The method may be performed by a base station (e.g., the base station 102/180, the base station 310, and/or an apparatus 1502 of FIG. 15). Optional aspects are illustrated with a dashed line. The method may enable a base station to help improve encoding of packets at a transmitting device.

At 1402, the base station receives, from a transmitting device or a receiving device, a request to update network coding information for wireless communication, as described in connection with the network coding information update request 834 of FIG. 8. For example, 1402 may be performed by a request receiving component 1540 of the apparatus 1502 of FIG. 15. The transmitting device may be a first UE and the receiving device may be a second UE. In some examples, the transmitting device or the receiving device may be a UE exchanging encoded data packets with the base station. The request may be received from the UE. The request may be received in UCI or a MAC-CE from the transmitting device or the receiving device.

At 1404, the base station transmits updated network coding information to at least one of the transmitting device or the receiving device in response to the request, as described in connection with the updated network coding information 840 of FIG. 8. For example, 1404 may be performed by a network coding information component 1542 of the apparatus 1502 of FIG. 15.

The updated network coding information may include one or more network coding algorithm (e.g., may indicate LT codes, raptor codes, etc.). The network coding information may include at least one network coding parameter (e.g., an encoding distribution function, a decoding procedure, a random seed number, a maximum number of interactions, etc.). The updated network coding information may include one or more triggers to switch network coding algorithms and/or a time offset for switching to the network coding algorithms. The network coding information may include a combination of one or more of a network coding algorithm, at least one network coding parameter, a trigger to switch network coding algorithms, or a time offset for switching the network coding algorithms. The network coding information may be transmitted from a base station. For example, the network coding information may be transmitted, to the transmitting device or the receiving device, in at least one of an RRC configuration, an MAC-CE, or DCI. The transmitting device may be a first UE and the receiving device may be a second UE. A single configuration for the updated network coding information may be sent to the transmitting device and the receiving device. In other examples, multiple configurations for the updated network coding information may be sent to the transmitting device and the receiving device. The updated network coding information may be transmitted to the transmitting device and the receiving device in response to the request from the transmitting device. The updated network coding information may be transmitted to the transmitting device and the receiving device in response to the request from the receiving device.

Figure 15:
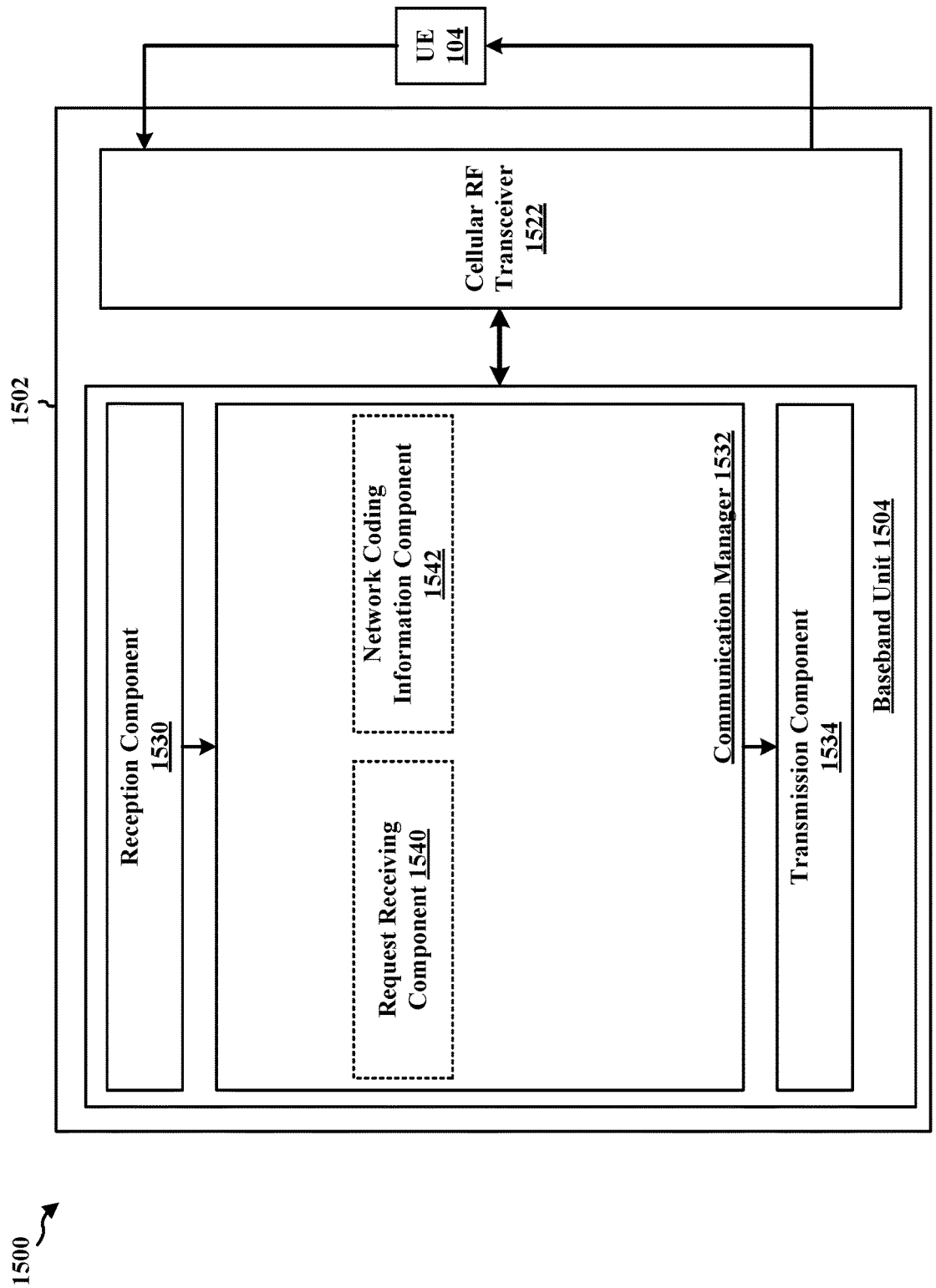
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 is a base station and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a request receiving component 1540 that is configured to receive a request to update network coding information for wireless communication, for example, as described in connection with 1502 of FIG. 15. The communication manager 1532 also includes a network coding information component 1542 that is configured to transmit updated network coding information to at least one of the transmitting device or the receiving device in response to the request, for example, as described in connection with 1504 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving, from a transmitting device or a receiving device, a request to update network coding information for wireless communication. The example apparatus 1502 also includes means for transmitting updated network coding information to at least one of the transmitting device or the receiving device in response to the request.

The aforementioned means may be one or more of the aforementioned components of the apparatus 1502 configured to perform the functions recited by the aforementioned means. As described supra, the apparatus 1502 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 16:
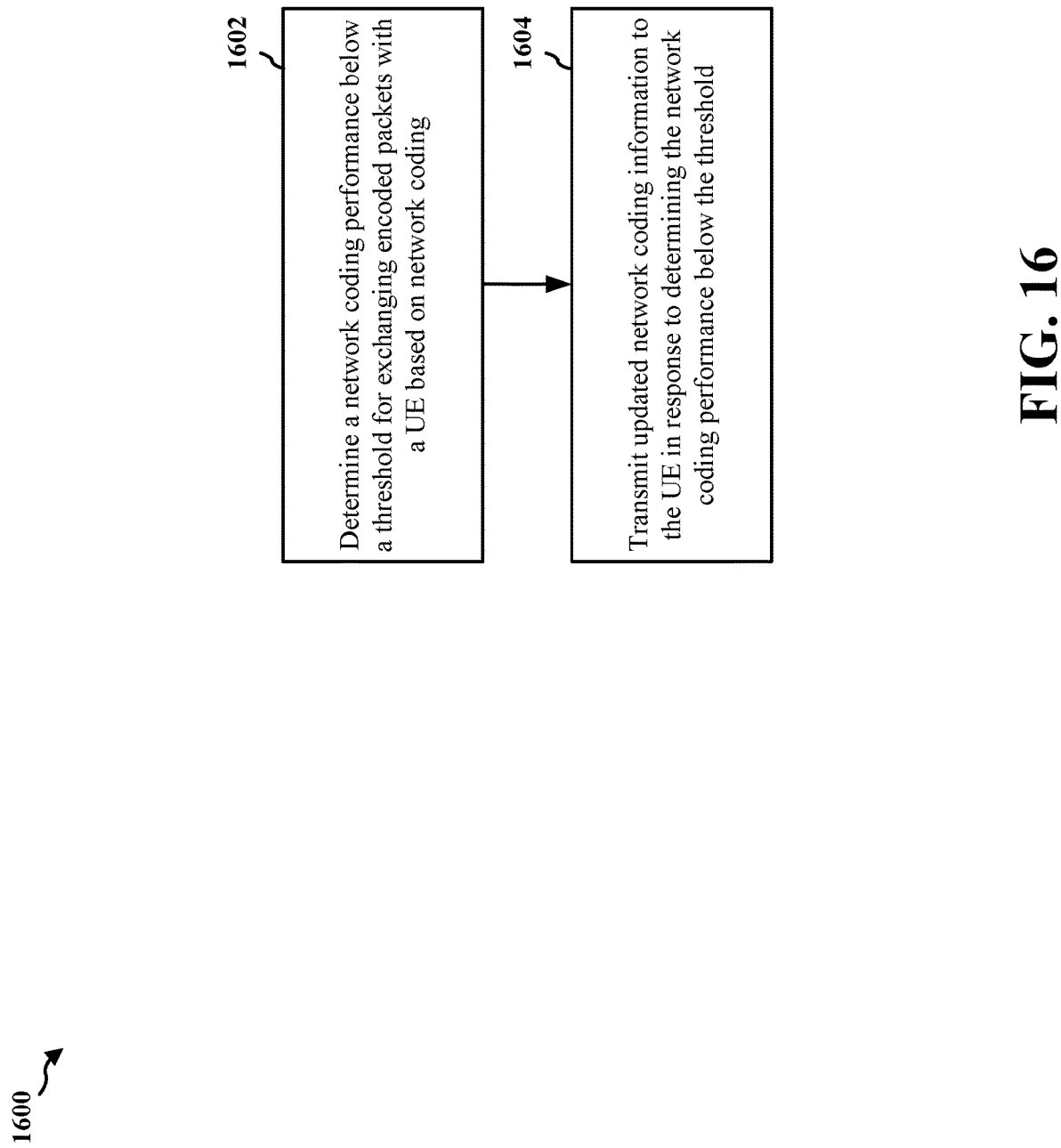
FIG. 16 is a flowchart of a method of wireless communication at a base station, in accordance with the teachings disclosed herein.

FIG. 16 is a flowchart 1600 of a method of wireless communication. The method may be performed by a base station (e.g., the base station 102/180, the base station 310, and/or an apparatus 1702 of FIG. 17). Optional aspects are illustrated with a dashed line. The method may enable a base station to help improve encoding of packets at a transmitting device.

At 1602, the base station determines a network coding performance below a threshold for exchanging encoded packets with a UE based on network coding, as described in connection with 832 of FIG. 8 and/or 1150 of FIG. 11. For example, 1602 may be performed by a network coding performance component 1740 of the apparatus 1702 of FIG. 17. The network coding performance may be determined for downlink transmissions to the UE. Alternately, the network coding performance may be determined based on an uplink transmission from the UE.

At 1604, the base station transmits updated network coding information to the UE in response to determining the network coding performance below the threshold, as described in connection with the updated network coding information 840 of FIG. 8 and/or the updated network coding information 1170 of FIG. 11. For example, 1604 may be performed by an update transmission component 1742 of the apparatus 1702 of FIG. 17.

The updated network coding information may include one or more network coding algorithm (e.g., may indicate LT codes, raptor codes, etc.). The network coding information may include at least one network coding parameter (e.g., an encoding distribution function, a decoding procedure, a random seed number, a maximum number of interactions, etc.). The updated network coding information may include one or more triggers to switch network coding algorithms and/or a time offset for switching to the network coding algorithms. The network coding information may include a combination of one or more of a network coding algorithm, at least one network coding parameter, a trigger to switch network coding algorithms, or a time offset for switching the network coding algorithms. For example, the network coding information may be transmitted by the base station in at least one of an RRC configuration, an MAC-CE, or DCI.

Figure 17:
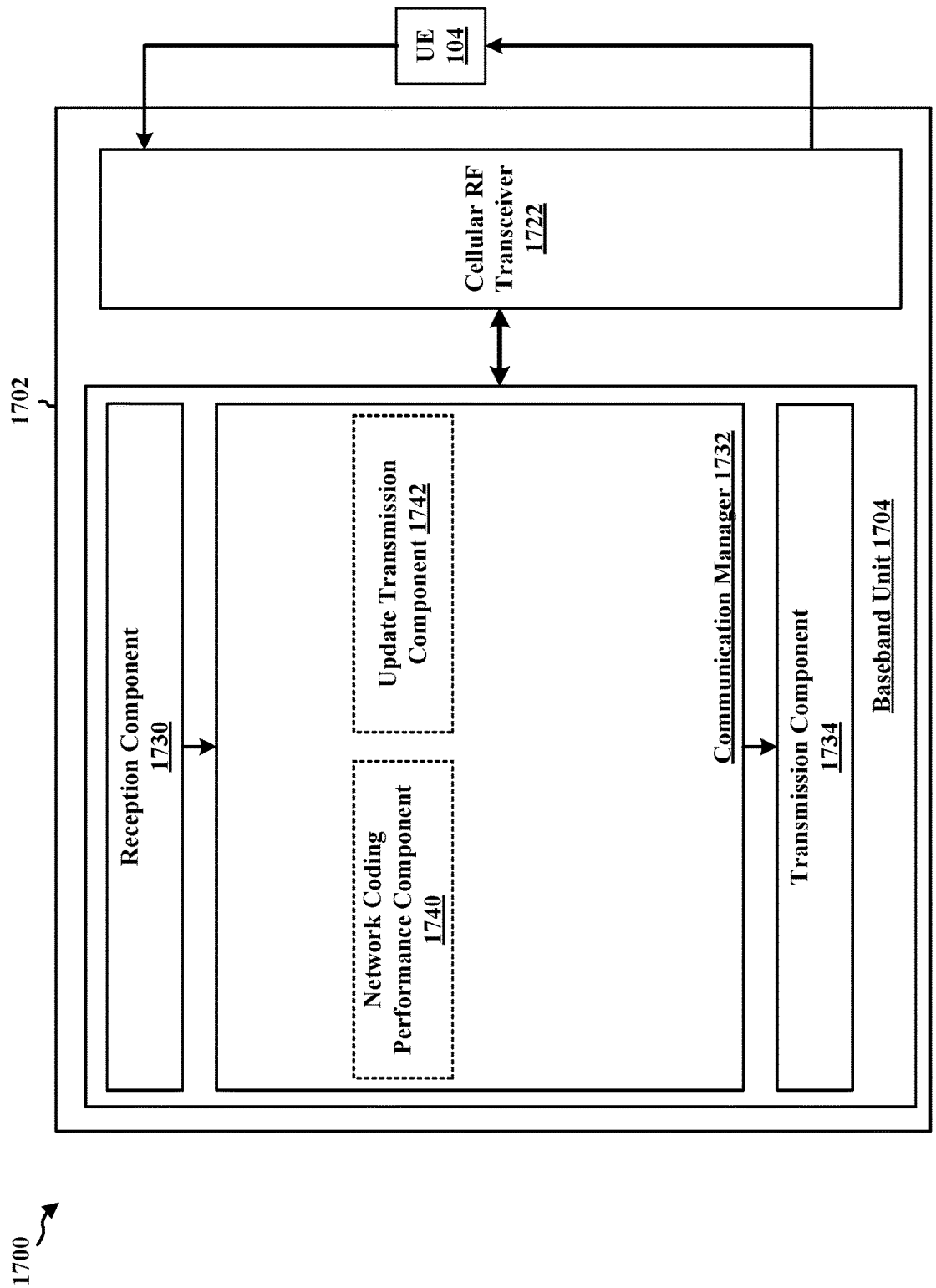
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 is a base station and includes a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a network coding performance component 1740 that is configured to determine a network coding performance below a threshold for exchanging encoded packets with a UE based on network coding, for example, as described in connection with 1602 of FIG. 16. The communication manager 1732 also includes an update transmission component 1742 that is configured to transmit updated network coding information to the UE in response to determining the network coding performance below the threshold, for example, as described in connection with 1604 of FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for determining a network coding performance below a threshold for exchanging encoded packets with a UE based on network coding. The example apparatus 1702 also includes means for transmitting updated network coding information to the UE in response to determining the network coding performance below the threshold.

The aforementioned means may be one or more of the aforementioned components of the apparatus 1702 configured to perform the functions recited by the aforementioned means. As described supra, the apparatus 1702 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 18:
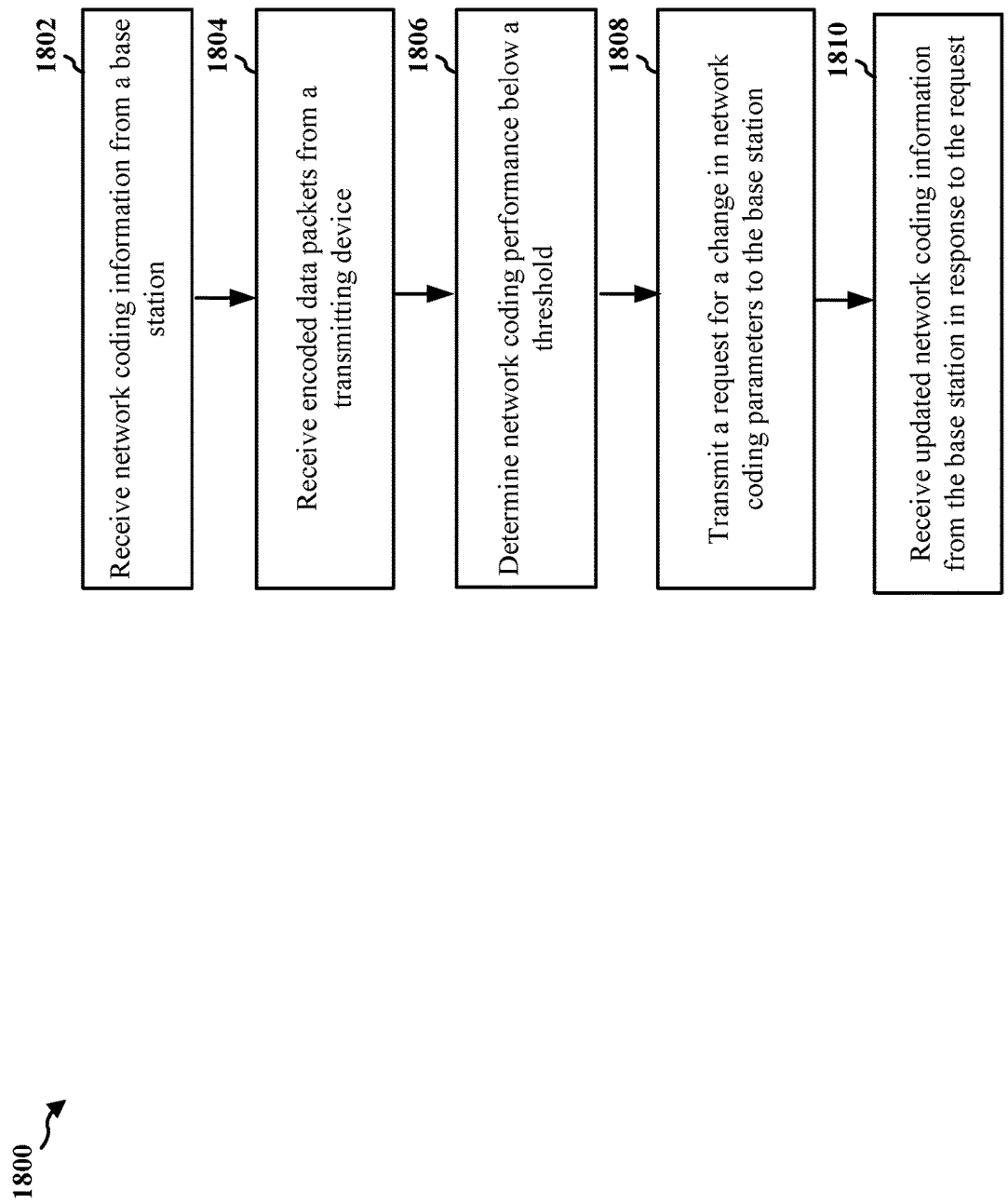
FIG. 18 is a flowchart of a method of wireless communication at a UE, in accordance with the teachings disclosed herein.

FIG. 18 is a flowchart 1800 of a method of wireless communication at a receiving device. The method may be performed by a UE (e.g., the UE 104, the UE 350, and/or an apparatus 1902 of FIG. 19). Optional aspects are illustrated with a dashed line. The method may enable a UE to help improve encoding of packets at a transmitting device for reception at the receiving device.

At 1802, the UE receives network coding information from a base station, as described in connection with the network coding information 810 of FIG. 8 and/or the network coding information 1110 of FIG. 11. For example, 1802 may be performed by a network coding information component 1940 of the apparatus 1902 of FIG. 19.

The network coding information may include one or more network coding algorithm (e.g., may indicate LT codes, raptor codes, etc.). The network coding information may include at least one network coding parameter (e.g., an encoding distribution function, a decoding procedure, a random seed number, a maximum number of interactions, etc.).

At 1804, the UE receives encoded data packets from a transmitting device, as described in connection with the encoded packets 814 of FIG. 8 and/or the encoded packets 1130 of FIG. 11. For example, 1804 may be performed by a packets reception component 1942 of the apparatus 1902 of FIG. 19. In some examples, the transmitting device may comprise the base station. In some examples, the transmitting device may comprise another UE.

At 1806, the UE determines network coding performance below a threshold, as described in connection with 822 of FIG. 8 and/or 1150 of FIG. 11. For example, 1806 may be performed by a network coding performance component 1944 of the apparatus 1902 of FIG. 19. The network coding performance may be based on network decoding results of the UE.

At 1808, the UE transmits a request for a change in network coding parameters to the base station, as described in connection with the network coding information update request 824 of FIG. 8 and/or the network coding information update request 1160 of FIG. 11. For example, 1808 may be performed by a request transmission component 1946 of the apparatus 1902 of FIG. 19. The UE may transmit the request for the change in UCI or a MAC-CE.

At 1810, the UE receives updated network coding information from the base station in response to the request, as described in connection with the updated network coding information 840 of FIG. 8 and/or the updated network coding information 1170 of FIG. 11. For example, 1810 may be performed by an update reception component 1948 of the apparatus 1902 of FIG. 19.

The updated network coding information may include one or more network coding algorithm (e.g., may indicate LT codes, raptor codes, etc.). The updated network coding information may include at least one network coding parameter (e.g., an encoding distribution function, a decoding procedure, a random seed number, a maximum number of interactions, etc.). The updated network coding information may include one or more triggers to switch network coding algorithms and/or a time offset for switching to the network coding algorithms. The network coding information may include a combination of one or more of a network coding algorithm, at least one network coding parameter, a trigger to switch network coding algorithms, or a time offset for switching the network coding algorithms. The network coding information may be received from a base station. For example, the network coding information may be received from the base station in at least one of an RRC configuration, an MAC-CE, or DCI.

Figure 19:
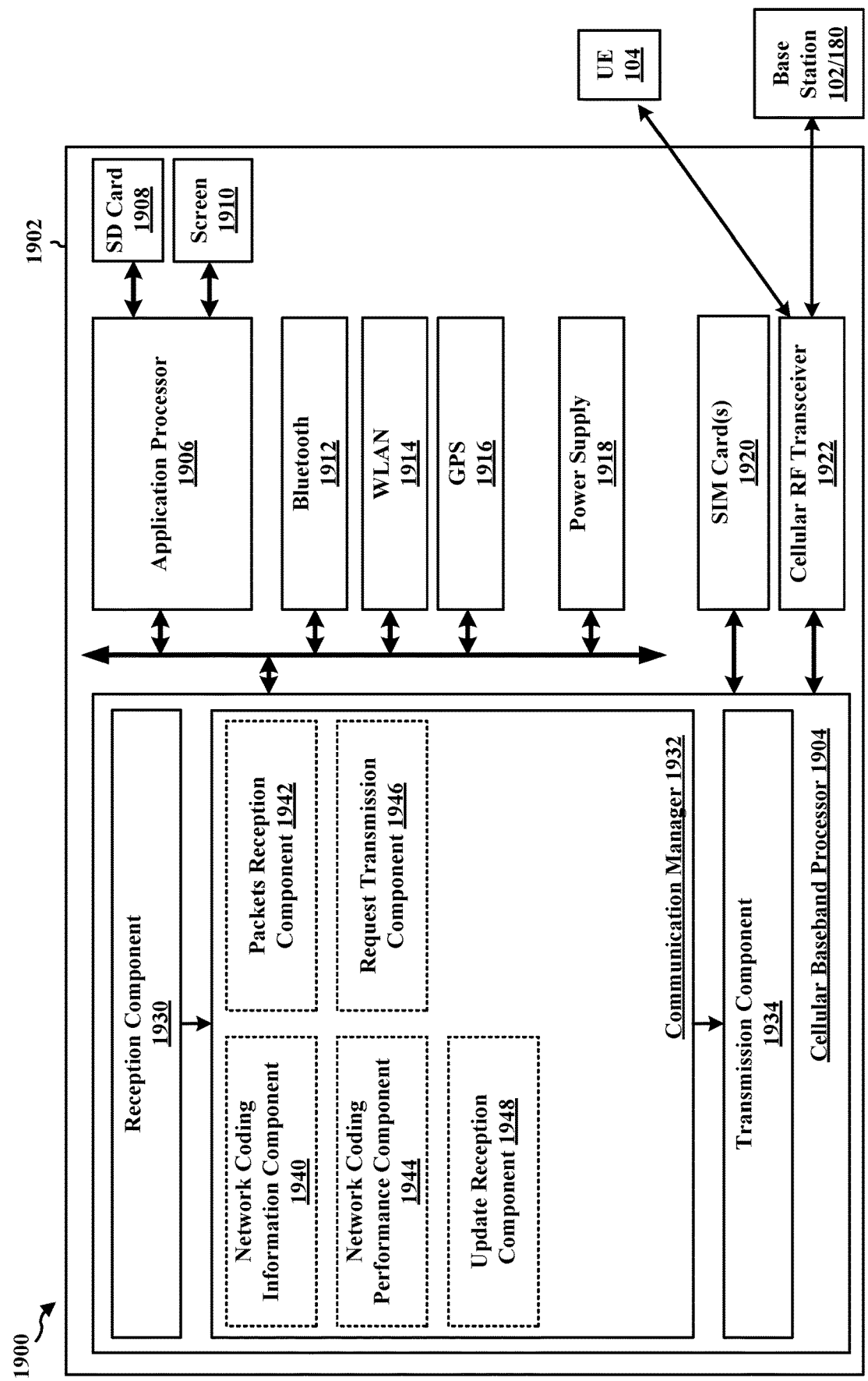
FIG. 19 is a diagram illustrating an example of a hardware implementation for an example apparatus, in accordance with the teachings disclosed herein.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or base station 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further include s a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see the UE 350 of FIG. 3) and include the additional modules of the apparatus 1902.

The communication manager 1932 includes a network coding information component 1940 that is configured to receive network coding information from a base station, for example, as described in connection with 1802 of FIG. 18. The communication manager 1932 also includes a packets reception component 1942 that is configured to receive encoded data packets from a transmitting device, for example, as described in connection with 1804 of FIG. 18. The communication manager 1932 also includes a network coding performance component 1944 that is configured to determine network coding performance below a threshold, for example, as described in connection with 1806 of FIG. 18. The communication manager 1932 also includes a request transmission component 1946 that is configured to transmit a request for a change in network coding parameters to the base station, for example, as described in connection with 1808 of FIG. 18. The communication manager 1932 also includes an update reception component 1948 that is configured to receive updated network coding information from the base station in response to the request, for example, as described in connection with 1810 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for receiving network coding information from a base station.

The example apparatus 1902 also includes means for receiving encoded data packets from a transmitting device. The example apparatus 1902 also includes means for determining network coding performance below a threshold. The example apparatus 1902 also includes means for transmitting a request for a change in network coding parameters to the base station. The example apparatus 1902 also includes means for receiving updated network coding information from the base station in response to the request.

The aforementioned means may be one or more of the aforementioned components of the apparatus 1902 configured to perform the functions recited by the aforementioned means. As described supra, the apparatus 1902 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a transmitting device, comprising: encoding data packets based on a first network coding; transmitting encoded data packets to a receiving device; receiving network coding information; determining a second network coding applied by the receiving device based on the network coding information; receiving feedback from the receiving device; decoding the encoded data packets based on the second network coding applied by the receiving device; and updating the first network coding applied by the transmitting device based on the feedback and the decoding of the encoded data packets.

Aspect 2 is the method of aspect 1, further including that the network coding information includes one or more of: a network coding algorithm, at least one network coding parameter, a trigger to switch network coding algorithms, or a time offset to the network coding algorithms.

Aspect 3 is the method of any of aspect 1 or aspect 2, further including that the network coding information includes the at least one network coding parameter, comprising one or more of: an encoding distribution function, a decoding procedure, a random seed number, or a threshold number of interactions.

Aspect 4 is the method of any of aspects 1 to 3, further including that the transmitting device is a first UE and the receiving device is a second UE.

Aspect 5 is the method of any of aspects 1 to 4, further including that the network coding information is received from a base station.

Aspect 6 is the method of any of aspects 1 to 5, further including that the network coding information is received from the base station in at least one of: an RRC configuration, a MAC-CE, or DCI.

Aspect 7 is the method of any of aspects 1 to 6, further including that the feedback comprises an RLC status report from an RLC layer of the receiving device or HARQ feedback from the receiving device.

Aspect 8 is the method of any of aspects 1 to 7, further including: determining network coding performance below a threshold; and transmitting a request for a change in network coding parameters, wherein the network coding information is received in response to the request.

Aspect 9 is the method of any of aspects 1 to 8, further including that the transmitting device transmits the request for the change in UCI or a MAC-CE.

Aspect 10 is the method of any of aspects 1 to 9, further including that the network coding performance is based on network decoding results of the receiving device.

Aspect 11 is the method of any of aspects 1 to 10, further including that the first network coding applied by the transmitting device is updated in response to the feedback from the receiving device.

Aspect 12 is an apparatus for wireless communication including at least one processor coupled to a memory and configured to implement a method as in any of aspects 1 to 11.

Aspect 13 is an apparatus for wireless communication including means for implementing a method as in any of aspects 1 to 11.

Aspect 14 is a non-transitory computer-readable storage medium storing computer executable code, where the code, when executed, causes a processor to implement a method as in any of aspects 1 to 11.

Aspect 15 is a method of wireless communication at a base station, comprising: receiving, from a transmitting device or a receiving device, a request to update network coding information for wireless communication; and transmitting updated network coding information to at least one of the transmitting device or the receiving device in response to the request.

Aspect 16 is the method of aspect 15, further including that the transmitting device is a first UE and the receiving device is a second UE.

Aspect 17 is the method of any of aspect 15 or aspect 16, further including that a single configuration for the updated network coding information is sent to the transmitting device and the receiving device.

Aspect 18 is the method of any of aspects 15 to 17, further including that multiple configurations for the updated network coding information are sent to the transmitting device and the receiving device.

Aspect 19 is the method of any of aspects 15 to 18, further including that the updated network coding information is transmitted to the transmitting device and the receiving device in response to the request from the transmitting device.

Aspect 20 is the method of any of aspects 15 to 19, further including that the updated network coding information is transmitted to the transmitting device and the receiving device in response to the request from the receiving device.

Aspect 21 is the method of any of aspects 15 to 20, further including that the transmitting device or the receiving device is a UE exchanging encoded data packets with the base station.

Aspect 22 is the method of any of aspects 15 to 21, further including that the request is received from the UE.

Aspect 23 is the method of any of aspects 15 to 22, further including that the request is received in UCI or a MAC-CE from the transmitting device or the receiving device.

Aspect 24 is the method of any of aspects 15 to 23, further including that the updated network coding information includes one or more of: a network coding algorithm, at least one network coding parameter, a trigger to switch network coding algorithms, or a time offset to the network coding algorithms.

Aspect 25 is the method of any of aspects 15 to 24, further including that the updated network coding information includes the at least one network coding parameter, comprising one or more of: an encoding distribution function, a decoding procedure, a random seed number, or a threshold number of interactions.

Aspect 26 is the method of any of aspects 15 to 25, further including that the updated network coding information is transmitted to the at least one of the transmitting device or the receiving device in at least one of: an RRC configuration, a MAC-CE, or DCI.

Aspect 27 is an apparatus for wireless communication including at least one processor coupled to a memory and configured to implement a method as in any of aspects 15 to 26.

Aspect 28 is an apparatus for wireless communication including means for implementing a method as in any of aspects 15 to 26.

Aspect 29 is a non-transitory computer-readable storage medium storing computer executable code, where the code, when executed, causes a processor to implement a method as in any of aspects 15 to 26.

Aspect 30 is a method of wireless communication at a base station, comprising: determining a network coding performance below a threshold for exchanging encoded packets with a UE based on network coding; and transmitting updated network coding information to the UE in response to determining the network coding performance below the threshold.

Aspect 31 is the method of aspect 30, further including that the network coding performance is determined for downlink transmissions to the UE.

Aspect 32 is the method of any of aspect 30 or aspect 31, further including that the network coding performance is determined based on an uplink transmission from the UE.

Aspect 33 is the method of any of aspects 30 to 32, further including that the updated network coding information includes one or more of: a network coding algorithm, at least one network coding parameter, a trigger to switch network coding algorithms, or a time offset to the network coding algorithms.

Aspect 34 is the method of any of aspects 30 to 33, further including that the updated network coding information includes the at least one network coding parameter, comprising one or more of: an encoding distribution function, a decoding procedure, a random seed number, or a threshold number of interactions.

Aspect 35 is the method of any of aspects 30 to 34, further including that the updated network coding information is transmitted to the UE in at least one of: an RRC configuration, a MAC-CE, or DCI.

Aspect 36 is an apparatus for wireless communication including at least one processor coupled to a memory and configured to implement a method as in any of aspects 30 to 35.

Aspect 37 is an apparatus for wireless communication including means for implementing a method as in any of aspects 30 to 35.

Aspect 38 is a non-transitory computer-readable storage medium storing computer executable code, where the code, when executed, causes a processor to implement a method as in any of aspects 30 to 35.

Aspect 39 is a method of wireless communication at a UE, comprising: receiving network coding information from a base station; receiving encoded data packets from a transmitting device; determining network coding performance below a threshold; transmitting a request for a change in network coding parameters to the base station; and receiving updated network coding information from the base station in response to the request.

Aspect 40 is the method of aspect 39, further including that the UE transmits the request for the change in UCI or a MAC-CE.

Aspect 41 is the method of any of aspect 39 or aspect 40, further including that the network coding performance is based on network decoding results of the UE.

Aspect 42 is the method of any of aspects 39 to 41, further including that the updated network coding information includes one or more of: a network coding algorithm, at least one network coding parameter, a trigger to switch network coding algorithms, or a time offset to the network coding algorithms.

Aspect 43 is the method of any of aspects 39 to 42, further including that the updated network coding information includes the at least one network coding parameter, comprising one or more of: an encoding distribution function, a decoding procedure, a random seed number, or a threshold number of interactions.

Aspect 44 is the method of any of aspects 39 to 43, further including that the updated network coding information is received from the base station in at least one of: an RRC configuration, a MAC-CE, or DCI.

Aspect 45 is the method of any of aspects 39 to 44, further including that the transmitting device comprises the base station.

Aspect 46 is the method of any of aspects 39 to 45, further including that the transmitting device comprises another UE.

Aspect 47 is an apparatus for wireless communication including at least one processor coupled to a memory and configured to implement a method as in any of aspects 39 to 46.

Aspect 48 is an apparatus for wireless communication including means for implementing a method as in any of aspects 39 to 46.

Aspect 49 is a non-transitory computer-readable storage medium storing computer executable code, where the code, when executed, causes a processor to implement a method as in any of aspects 39 to 46.

What is claimed is:

1. A method of wireless communication at a transmitting device, comprising:
    encoding data packets based on a first network coding;
    transmitting encoded data packets to a receiving device;
    receiving network coding information;
    determining a second network coding applied by the receiving device based on the network coding information;
    receiving feedback from the receiving device;
    decoding the encoded data packets based on the second network coding applied by the receiving device; and
    updating the first network coding applied by the transmitting device based on the feedback and decoding of the encoded data packets, wherein the updating the first network coding comprises updating at least one of a network coding algorithm, a trigger to switch network coding algorithms, or a time offset to the network coding algorithms.

2. The method of claim 1, wherein the network coding information includes one or more of:
    the network coding algorithm, at least one network coding parameter,
    the trigger to switch network coding algorithms, or
    the time offset to the network coding algorithms.

3. The method of claim 2, wherein the network coding information includes the at least one network coding parameter, comprising one or more of:
    an encoding distribution function,
    a decoding procedure,
    a random seed number, or
    a threshold number of interactions.

4. The method of claim 1, wherein the transmitting device is a first user equipment (UE) and the receiving device is a second UE.

5. The method of claim 4, wherein the network coding information is received from a base station.

6. The method of claim 5, wherein the network coding information is received from the base station in at least one of:
    a radio resource control (RRC) configuration,
    a medium access control-control element (MAC-CE), or
    downlink control information (DCI).

7. The method of claim 1, wherein the feedback comprises a radio link control (RLC) status report from an RLC layer of the receiving device or hybrid automatic repeat request (HARD) feedback from the receiving device.

8. The method of claim 1, wherein the first network coding applied by the transmitting device is updated in response to the feedback from the receiving device.

9. A method of wireless communication at a transmitting device, comprising:
    encoding data packets based on a first network coding;
    transmitting encoded data packets to a receiving device;
    receiving network coding information;
    determining a second network coding applied by the receiving device based on the network coding information;
receiving feedback from the receiving device;
    decoding the encoded data packets based on the second network coding applied by the receiving device;
    determining network coding performance below a threshold;
    transmitting a request for a change in network coding parameters, wherein the network coding information is received in response to the request and
    updating the first network coding applied by the transmitting device based on the feedback and decoding of the encoded data packets.

10. The method of claim 9, wherein the transmitting device transmits the request for the change in uplink control information (UCI) or a medium access control-control element (MAC-CE).

11. The method of claim 9, wherein the network coding performance is based on network decoding results of the receiving device.

* * * * *